US011352545B2

(12) United States Patent
Amanullah et al.

(10) Patent No.: US 11,352,545 B2
(45) Date of Patent: Jun. 7, 2022

(54) LOST CIRCULATION MATERIAL FOR RESERVOIR SECTION

(71) Applicant: Saudi Arabian Oil Company, Dhahran (SA)

(72) Inventors: Md Amanullah, Dhahran (SA); Raed A. Alouhali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/991,817

(22) Filed: Aug. 12, 2020

(65) Prior Publication Data

US 2022/0049147 A1    Feb. 17, 2022

(51) Int. Cl.
| | | |
|---|---|---|
| *C09K 8/50* | (2006.01) | |
| *E21B 21/00* | (2006.01) | |
| *C09K 8/504* | (2006.01) | |
| *C09K 8/508* | (2006.01) | |
| *B33Y 80/00* | (2015.01) | |

(52) U.S. Cl.
CPC ............ *C09K 8/5045* (2013.01); *C09K 8/508* (2013.01); *E21B 21/003* (2013.01); *B33Y 80/00* (2014.12); *C09K 2208/18* (2013.01)

(58) Field of Classification Search
CPC ...... E21B 2200/01; E21B 33/00; E21B 33/12; E21B 33/1208; E21B 33/13; E21B 33/134; E21B 21/003; E21B 33/138; E21B 33/136; E21B 41/0042; E21B 41/0035; E21B 21/00; E21B 21/01; E21B 2200/00; C09K 8/50; C09K 8/504; C09K 8/5045; C09K 8/516; C09K 2208/18; C09K 8/508
See application file for complete search history.

(56) References Cited

U.S. PATENT DOCUMENTS

| | | |
|---|---|---|
| 2,452,724 A | 11/1948 | Bradshaw |
| 2,626,779 A | 1/1953 | Armentrout |
| (Continued) | | |

FOREIGN PATENT DOCUMENTS

| | | |
|---|---|---|
| CN | 1318427 | 10/2001 |
| CN | 101157850 | 4/2008 |
| (Continued) | | |

OTHER PUBLICATIONS

Maiti et al., Age-aware consitutive materials model fora 3D printed polymeric foam, 2019, Scientific Reports, 9:15923 (Year: 2019).*

(Continued)

*Primary Examiner* — Angela M DiTrani Leff
(74) *Attorney, Agent, or Firm* — Fish & Richardson P.C.

(57) ABSTRACT

Loss circulation material (LCM) and method for treating loss circulation in a wellbore in a subterranean formation, including placing the LCM having a solid body with permeable portions or pores into the wellbore to dispose the LCM at the loss circulation zone, and collecting solids onto the LCM at the loss circulation zone to form a barrier. The LCM may be applied at a loss circulation zone in a hydrocarbon reservoir section of the subterranean formation, and upon subsequent hydrocarbon production the collected solids may be dislodged by the produced hydrocarbon to allow for hydrocarbon production through the permeable portions or pores of the disposed LCM.

20 Claims, 8 Drawing Sheets

(56) References Cited

U.S. PATENT DOCUMENTS

| | | | |
|---|---|---|---|
| 2,789,948 A | 4/1957 | Tronolone | |
| 2,933,136 A * | 4/1960 | Ayers | E21B 33/138 |
| | | | 166/284 |
| 2,943,679 A | 7/1960 | Fischer et al. | |
| 2,944,018 A * | 7/1960 | Borcherdt | E21B 21/003 |
| | | | 507/117 |
| 3,042,607 A | 7/1962 | Morris | |
| 3,132,693 A | 5/1964 | Weisend | |
| 3,410,797 A | 11/1968 | Walker et al. | |
| 3,629,102 A | 12/1971 | Lummus et al. | |
| 3,761,410 A | 9/1973 | Mondshine et al. | |
| 3,966,632 A | 6/1976 | Colliopoulos et al. | |
| 4,063,603 A | 12/1977 | Rayborn | |
| 4,181,617 A | 1/1980 | Elrod et al. | |
| 4,280,915 A | 7/1981 | Kercheville | |
| 4,340,858 A | 7/1982 | Malloy | |
| 4,458,528 A | 7/1984 | Roper et al. | |
| 4,472,882 A | 9/1984 | Hutter | |
| 4,474,665 A | 10/1984 | Green | |
| 4,491,181 A | 1/1985 | Krol | |
| 4,770,795 A | 9/1988 | Giddings et al. | |
| 4,783,274 A | 11/1988 | Jokinen et al. | |
| 4,802,998 A | 2/1989 | Mueller et al. | |
| 4,829,816 A | 5/1989 | Hubbard | |
| 5,009,269 A | 4/1991 | Moran et al. | |
| 5,052,219 A | 10/1991 | Fery | |
| 5,118,664 A | 6/1992 | Burts, Jr. | |
| 5,161,407 A | 11/1992 | Ankeny et al. | |
| 5,252,554 A | 10/1993 | Mueller et al. | |
| 5,253,709 A | 10/1993 | Kendrick et al. | |
| 5,260,268 A | 11/1993 | Hubbard | |
| 5,294,651 A | 3/1994 | Stephens | |
| 5,332,724 A | 7/1994 | Burts, Jr. | |
| 5,338,471 A | 8/1994 | Lal | |
| 5,380,469 A | 1/1995 | Flider et al. | |
| 5,407,879 A | 4/1995 | Kajita | |
| 5,424,284 A | 6/1995 | Patel et al. | |
| 5,501,275 A | 3/1996 | Card et al. | |
| 5,525,126 A | 6/1996 | Basu et al. | |
| 5,587,354 A | 12/1996 | Duncan, Jr. | |
| 5,602,341 A | 2/1997 | Lee | |
| 5,637,795 A | 6/1997 | Hale et al. | |
| 5,676,213 A | 10/1997 | Auzerais | |
| 5,698,502 A | 12/1997 | Pafford et al. | |
| 5,703,022 A | 12/1997 | Floyd | |
| 5,713,965 A | 2/1998 | Foglia et al. | |
| 5,718,747 A | 2/1998 | Okusawa | |
| 5,747,434 A | 5/1998 | Lamsa et al. | |
| 5,789,349 A | 8/1998 | Patel | |
| 5,885,946 A | 3/1999 | Lamsa | |
| 6,045,070 A | 4/2000 | Davenport | |
| 6,055,850 A | 5/2000 | Turner et al. | |
| 6,127,560 A | 10/2000 | Stidham et al. | |
| 6,267,186 B1 | 7/2001 | Hayatdavoudi | |
| 6,605,570 B2 | 8/2003 | Miller et al. | |
| 6,716,799 B1 | 4/2004 | Mueller et al. | |
| 6,746,611 B2 | 6/2004 | Davidson | |
| 6,806,235 B1 | 10/2004 | Mueller et al. | |
| 6,881,708 B2 | 4/2005 | Reddy et al. | |
| 6,887,283 B1 | 5/2005 | Ginosar et al. | |
| 7,008,474 B2 | 3/2006 | Konno et al. | |
| 7,066,285 B2 | 6/2006 | Shaarpour | |
| 7,226,895 B2 | 6/2007 | Xiang | |
| 7,402,339 B2 | 7/2008 | Schmidt et al. | |
| 7,422,061 B2 | 9/2008 | Jones et al. | |
| 7,524,798 B2 | 4/2009 | Kunz et al. | |
| 7,753,128 B2 | 7/2010 | Moen | |
| 7,989,402 B2 | 8/2011 | Dino et al. | |
| 8,043,997 B2 | 10/2011 | Whitfill et al. | |
| 8,307,916 B1 * | 11/2012 | Wald | C09K 8/508 |
| | | | 175/72 |
| 8,393,411 B2 | 3/2013 | Dupriest et al. | |
| 8,413,745 B2 | 4/2013 | Xiang et al. | |
| 8,479,817 B2 | 7/2013 | Shindgikar et al. | |
| 8,563,479 B2 | 10/2013 | Amanullah et al. | |
| 8,563,482 B2 | 10/2013 | Amanullah | |
| 8,607,895 B2 | 12/2013 | Hoskins | |
| 8,613,319 B2 | 12/2013 | Sodhi | |
| 8,726,990 B2 | 5/2014 | Karcher et al. | |
| 8,887,808 B2 | 11/2014 | Kumar et al. | |
| 9,175,205 B2 | 11/2015 | Amanullah et al. | |
| 9,366,098 B2 | 6/2016 | Wu | |
| 9,688,901 B2 | 6/2017 | Fontenot | |
| 9,783,727 B2 | 10/2017 | Lehman et al. | |
| 9,803,129 B2 | 10/2017 | Breeden et al. | |
| 9,834,718 B2 | 12/2017 | Amanullah et al. | |
| 9,932,510 B2 | 4/2018 | Walker et al. | |
| 10,301,523 B2 | 5/2019 | Savari et al. | |
| 10,415,331 B2 | 9/2019 | Snoswell | |
| 10,494,884 B2 | 12/2019 | Amanullah et al. | |
| 10,597,576 B2 | 3/2020 | Mettath et al. | |
| 10,851,283 B2 * | 12/2020 | Potapenko | C09K 8/02 |
| 2002/0096366 A1 | 7/2002 | Davidson | |
| 2003/0130135 A1 | 7/2003 | Hou et al. | |
| 2003/0158046 A1 | 8/2003 | Patel et al. | |
| 2004/0002427 A1 | 1/2004 | Goncalves et al. | |
| 2004/0082483 A1 | 4/2004 | Muller et al. | |
| 2004/0129460 A1 | 7/2004 | MacQuoid et al. | |
| 2005/0113260 A1 | 5/2005 | Wood | |
| 2005/0204612 A1 | 9/2005 | Connemann et al. | |
| 2005/0217852 A1 | 10/2005 | Bennett | |
| 2005/0221994 A1 | 10/2005 | Xiang | |
| 2006/0035790 A1 | 2/2006 | Okell et al. | |
| 2006/0213663 A1 | 9/2006 | Vargo | |
| 2006/0293533 A1 | 12/2006 | Iyer | |
| 2007/0125158 A1 | 6/2007 | Kelleher | |
| 2007/0187099 A1 * | 8/2007 | Wang | C09K 8/516 |
| | | | 166/295 |
| 2007/0287636 A1 | 12/2007 | Heller et al. | |
| 2008/0121564 A1 | 5/2008 | Smith | |
| 2008/0318812 A1 | 12/2008 | Kakadjian, Sr. et al. | |
| 2009/0044617 A1 | 2/2009 | DiFoggio et al. | |
| 2009/0054284 A1 | 2/2009 | Sunkara | |
| 2009/0075847 A1 | 3/2009 | Wawrzos et al. | |
| 2009/0131711 A1 | 5/2009 | Wanasundara | |
| 2009/0140830 A1 | 6/2009 | Amanullah et al. | |
| 2009/0266541 A1 | 10/2009 | Reynolds | |
| 2010/0000795 A1 | 1/2010 | Kakadjian et al. | |
| 2010/0173805 A1 | 7/2010 | Pomerleau | |
| 2010/0181073 A1 | 7/2010 | Dupriest et al. | |
| 2010/0230164 A1 | 9/2010 | Pomerleau | |
| 2010/0230169 A1 | 9/2010 | Pomerleau | |
| 2010/0292107 A1 | 11/2010 | Rayborn | |
| 2010/0298176 A1 | 11/2010 | Maker et al. | |
| 2011/0009299 A1 | 1/2011 | Van Zanten | |
| 2011/0290012 A1 | 12/2011 | Jappy et al. | |
| 2011/0297375 A1 * | 12/2011 | Shindgikar | C09K 8/516 |
| | | | 166/276 |
| 2012/0071369 A1 | 3/2012 | Amanullah | |
| 2012/0108471 A1 | 5/2012 | Amanullah et al. | |
| 2012/0202723 A1 | 8/2012 | Abbey et al. | |
| 2013/0065798 A1 | 3/2013 | Amanullah | |
| 2013/0068478 A1 * | 3/2013 | Allen | E21B 33/138 |
| | | | 166/380 |
| 2013/0160998 A1 | 6/2013 | Azerais et al. | |
| 2013/0192358 A1 | 8/2013 | Murphy et al. | |
| 2013/0210630 A1 | 8/2013 | Musa et al. | |
| 2013/0284518 A1 | 10/2013 | Wu et al. | |
| 2013/0324443 A1 | 12/2013 | Nang et al. | |
| 2014/0005079 A1 | 1/2014 | Dahanayake et al. | |
| 2014/0102188 A1 | 4/2014 | Murphy et al. | |
| 2014/0174168 A1 | 6/2014 | Amanullah et al. | |
| 2014/0182369 A1 | 7/2014 | Blue et al. | |
| 2014/0216149 A1 | 8/2014 | Zhou et al. | |
| 2014/0231082 A1 * | 8/2014 | Jamison | C09K 8/03 |
| | | | 166/278 |
| 2014/0309146 A1 | 10/2014 | D'Elia et al. | |
| 2014/0353043 A1 | 12/2014 | Amanullah et al. | |
| 2015/0008044 A1 | 1/2015 | Fontenot | |
| 2015/0051120 A1 | 2/2015 | Hurd | |
| 2015/0275607 A1 | 10/2015 | Kraemer et al. | |
| 2015/0292278 A1 | 10/2015 | Wang | |
| 2016/0060501 A1 | 3/2016 | Kefi et al. | |
| 2016/0061701 A1 | 3/2016 | Amanullah et al. | |

(56) References Cited

U.S. PATENT DOCUMENTS

| | | | |
|---|---|---|---|
| 2016/0130939 A1 | 5/2016 | Murphy et al. | |
| 2016/0168443 A1 | 6/2016 | Lafite et al. | |
| 2016/0237767 A1* | 8/2016 | Snoswell | C04B 28/02 |
| 2016/0244654 A1 | 8/2016 | Way et al. | |
| 2016/0266030 A1 | 9/2016 | Amanullah | |
| 2016/0298018 A1 | 10/2016 | Medvedev et al. | |
| 2016/0312102 A1 | 10/2016 | Witfill et al. | |
| 2017/0058180 A1 | 3/2017 | Hossain | |
| 2017/0137691 A1 | 5/2017 | Deroo et al. | |
| 2018/0266197 A1 | 9/2018 | Amanullah et al. | |
| 2019/0144732 A1 | 5/2019 | Ramasamy et al. | |
| 2020/0248527 A1* | 8/2020 | Hitchcock | E21B 33/13 |
| 2021/0054716 A1* | 2/2021 | Al-Mousa | E21B 21/003 |
| 2021/0388685 A1* | 12/2021 | Li | E21B 21/003 |

FOREIGN PATENT DOCUMENTS

| | | | |
|---|---|---|---|
| CN | 102286273 | 12/2011 | |
| CN | 104371674 | 2/2015 | |
| CN | 106833556 | 6/2017 | |
| EP | 0324887 | 7/1989 | |
| EP | 0374671 | 6/1990 | |
| EP | 0770661 | 5/1997 | |
| EP | 1206437 | 5/2002 | |
| EP | 1137936 | 7/2003 | |
| EP | 2110429 | 10/2009 | |
| EP | 2749880 | 7/2014 | |
| FR | 2758185 | 7/1998 | |
| FR | 2781498 | 1/2000 | |
| GB | 2106956 | 4/1983 | |
| GB | 2275342 | 8/1994 | |
| GB | 2506603 | 4/2014 | |
| GB | 2518441 A * | 3/2015 | C09K 8/502 |
| IN | 200400391 | 4/2009 | |
| RO | 126123 | 3/2011 | |
| RU | 2055089 | 2/1996 | |
| RU | 2076132 | 5/1997 | |
| RU | 2336291 | 10/2008 | |
| RU | 2652378 | 11/2017 | |
| SU | 1118663 | 10/1984 | |
| WO | WO 1996040835 | 12/1996 | |
| WO | WO 1999000575 | 1/1999 | |
| WO | WO 2000023538 | 4/2000 | |
| WO | WO 2001009039 | 2/2001 | |
| WO | WO 2002046253 | 6/2002 | |
| WO | WO 2002062920 | 8/2002 | |
| WO | WO 2008011731 | 1/2008 | |
| WO | WO 2008064469 | 6/2008 | |
| WO | WO 2009029451 | 3/2009 | |
| WO | WO 2010064009 | 6/2010 | |
| WO | WO 2010065634 | 6/2010 | |
| WO | WO 2010142370 | 12/2010 | |
| WO | WO 2012039912 | 3/2012 | |
| WO | WO 2013078374 | 5/2013 | |
| WO | WO 2013120636 | 8/2013 | |
| WO | WO 2013126287 | 8/2013 | |
| WO | WO 2013170055 | 11/2013 | |
| WO | WO 2014098219 | 6/2014 | |
| WO | WO 2016144700 | 9/2016 | |
| WO | WO 2017176244 | 10/2017 | |
| WO | WO 2018005575 | 1/2018 | |

OTHER PUBLICATIONS

Alawad et al., "Utilization of shredded waste car tyres as a fracture seal material (FSM) in oil and gas drilling operations," Journal of Petroleum and Gas Engineering, 8:3 (21-28), May 30, 2017, 8 pages.

Aljaaidi et al., "Used tires recycling and utilization in Saudi Arabia," retrieved from URL: <http://fac.ksu.edu.sa/sites/default/files/final_reporrt_.pdf>, retrieved on Oct. 1, 2018, published May 1, 2014, 229 pages.

Alsaba, "Investigation of lost circulation materials impact on fracture gradient," dissertation in partial fulfillment of the requirements for the degree of Doctor of Philosophy in Petroleum Engineering, Missouri University of Science and Technology, Fall 2015, 184 pages.

Alsaba, "Lost Circulation Materials Capability of Sealing Wide Fractures," SPE-170285-MS, Society of Petroleum Enginners (SPE), presented at the SPE Deepwater Drilling and Completions Conference, Sep. 10-11, 2014, 12 pages.

Amanullah et al., "Application of an indigenous eco-friendly raw material as fluid loss additive," Journal of Petroleum Science and Engineering, 139 (191-197), Dec. 28, 2015, 7 pages.

Amanullah, "Experimental Determination of Adhesive-Cohesive Bond Strength (ACBS) and Adhesion-Cohesion Modulus (ACM) of Mudcakes," IDAC/SPE 77198, Society of Petroleum Enginners (SPE), presented at the IADC/SPE Asia Pacific Drilling Technology, Jan. 1, 2002, 14 pages.

Amanullah, "Experimental Determination of Compressive, Pulling and Torsional Resistance of Mudcakes using a Triple Action Load Cell Assembly," South African Institute of Mining and Metallurgy; CSIRO Petroleum, Australia, ISRM 2003—Technology Roadmap for Rock Mechanics, 29-32, Jan. 1, 2003, 4 pages.

Amanullah, "Method and Appartus to Reduce the Probability of Differential Sticking," IADC/SPE-180506-MS, Society of Petroleum Engineers (SPE), IADC, presented at the IADC/SPE Asia Pacific Drilling Technology Conference, Aug. 22-24, 2016, 15 pages.

Bushnell-Watson et al., "Differential Sticking Laboratory Tests can Improve Mud Design," SPE 22549, Society of Petroleum Engineers (SPE), presented at the 66th Annual Technical Conference and Exhibition of the Society of Petroleum Engineers, Oct. 6-9, 1991, 10 pages.

Caenn et al., "Chapter 1: Selection of the Drilling Fluid," in Composition and Properties of Drilling and Completion Fluids, 7th Edition, Fult Professional Publishing, Nov. 2, 2016, 21-23, 3 pages.

Clark et al., "Evaluation of Spotting Fluids in a Full-Scale Differential-Pressure Sticking Apparatus," Society of Petroleum Engineers (SPE), SPE Drilling Engineering, Jun. 1992, 9 pages.

Cook et al., "Stabilizing the Wellbore to Prevent Lost Circulation," Oilfield Review, 23:4, Winter 2011, 10 pages.

Engelhardt, "Filter Cake Formation and Water Losses in Deep Drilling Muds," 1954, State of Illinois, 31 pages.

Fann, "Fluid Loss Test Instrument Single Cell Instruction Manual," Fann Instrument Company, Instruction Manual No. 100020420, Revision D, May 2014, 54 pages.

Fann, "Permeability Plugging Apparatus (PPA)," Fann product information, Drilling Fluids, Jan. 1, 2007, 2 pages.

Hettema et al., "Development of an Innovative High-Pressure Testing Device for the Evaluation of Drilling Fluid Systems and Drilling Fluid Additives Within Fractured Permeable Zones," retrieved from URL: <https://www.onepetro.org/download/conference-paper/OMC-2007-082? id=conference-paper/OMC-2007-082>, presented at the Offshore Mediterranean Conference and Exhibition, Mar. 28-30, 2007, 14 pages.

Hinkebein et al., "Static Slot Testing of Conventional Lost Circulation Materials," Sandia Report, Sand82-180, Unlimited Release, UC-66c, SF 2900-Q(6-82), Jan. 1983, 50 pages.

Jeennakorn, "The effect of testing conditions on lost circulation materials' performance in simulated fractures," dissertation in partial fulfillment of the requirements for the degree of Doctor of Philosophy in Petroleum Engineering at Missouri University of Science and Technology, Summer 2017, 136 pages.

Li et al., "An investigation on environmentally friendly biodiesel-based invert emulsion drilling fluid," Journal of Petroleum Exploration and Production Technology, 6:3 (505-517), Sep. 2016, 31 pages.

McBain et al., "The Hydrolysis of Soap Solutions, III. Values of pH and the Absence of Fatty Acid as Free Liquid or Solid," Journal of the American Oil Chemists Society, Nov. 5, 1948, 8 pages.

merriam-webster.com (online), "Spherical," retrieved from URL <http://www.merriam-webster.com/dictionary/spherical>, available on or before Apr. 22, 2009 via waybackmachine, retrieved on Oct. 18, 2017, 2 pages.

(56) References Cited

OTHER PUBLICATIONS

Miller et al., "Laboratory apparatus improves simulation of lost circulation conditions," AADE-13-FTCE-09, American Association of Drilling Engineers (AADE), presented at the 2013 AADE National Technical Conference and Exhibition, Feb. 26-27, 2013, 8 pages.

OFITE, "Permeability Plugging Tester—P.P.T. 2,000 PSI (13,800 kPa)—500 Degrees F (260 Degrees C), Part No. 171-90 (115V) Part No. 171-90-01 (230V) Instruction Manual," Version 3.0, OFI Testing Equipment, Inc., Jan. 4, 2017, 22 pages.

Sadecka and Szelag, "One-Step Synthesis of W/I and O/W Emulsifiers in the Presence of Surface Active Agents," Journal of Surfactants Deterg., 16:3 (305-315), May 2013, Sep. 2012, 11 pages.

Satyanarayana et al., "A comparative study of vegetable oil methyl esters (biodiesels)," Energy, 36:4 (2129-2137), Apr. 1, 2011, 9 pages.

Sherwood, "Differential Pressure Sticking of Drill String," AIChE Journal, 44:3, Mar. 1998, 11 pages.

Smith and Growcock, "Wellbore Strengthening While Drilling Above and Below Salt in the Gulf of Mexico," AADE-11-DF-HO-24, American Association of Drilling Engineers (AADE), presented at the 2008 AADE Fluids Conference and Exhibition on Apr. 8-9, 2008, 6 pages.

Wajheeuddin et al., "An Experimental Study on Particle Sizing of Natural Substitutes for Drilling Fluid Applications," Journal of Nature Science and Sustainable Technology 8:2, Apr. 1, 2014, 14 pages.

Whitfill and Miller, "Developing and Testing Lost Circulation Materials," AADE-08-NTCE-21, American Association of Drilling Engineers (AADE), presented at the 2008 AADE Fluids Conference and Exhibition on Apr. 8-9, 2008, 11 pages.

PCT International Search Report and Written Opinion in International Appln. No. PCT/US2021/045740, dated Nov. 16, 2021, 14 pages.

\* cited by examiner

400

LOST CIRCULATION MATERIAL FOR RESERVOIR SECTION

TECHNICAL FIELD

This disclosure relates to lost circulation material (LCM) for curing loss circulation in a wellbore in a subterranean formation.

BACKGROUND

In oil or gas well drilling, loss circulation occurs when drilling fluid (mud) or cement slurry flows into the subterranean formation instead of flowing up the annulus between the formation and the casing or work string. Loss circulation is the partial or complete loss of drilling fluid or cement slurry to the formation during drilling or cementing operations. Loss circulation can be brought on by natural or induced causes. Natural causes include naturally fractured formations or unconsolidated zones. Induced losses occur when the hydrostatic fluid column pressure exceeds the fracture gradient of the formation and the formation pores break down adequately to receive rather than resist the fluid. For non-cavernous formations, a loss circulation zone may be the result of fractures in the geological formation at the borehole or wellbore. When loss circulation occurs, both drilling fluid and cement slurry can be lost. Loss circulation material (LCM) is a name for substances added to drilling fluids when drilling fluids are being loss downhole to the subterranean formation. The LCM may be fibrous (e.g., tree bark, shredded cane stalks, mineral fibers, and animal hair), flaky (e.g., mica flakes and pieces of plastic or cellophane sheeting), or granular (e.g., ground and sized limestone, carbonates or marble, wood, nut hulls, Formica, corncobs, or cotton hulls). LCM may be introduced into a mud system to reduce or prevent the flow of drilling fluid into a permeable formation.

SUMMARY

An aspect relates to a method of treating loss circulation in a wellbore in a subterranean formation. The method placing loss circulation material (LCM) having pores into the wellbore, and flowing the LCM to dispose the LCM against the subterranean formation at a loss circulation zone in the wellbore. The method includes flowing wellbore fluid from the wellbore through the pores into the subterranean formation. The method includes collecting solids onto the LCM from the wellbore fluid flowed through the pores to form a barrier to treat the loss circulation at the loss circulation zone.

Another aspect relates to a method of treating loss circulation in a wellbore in a subterranean formation. The method positioning LCM objects at a loss circulation zone in the wellbore at a hydrocarbon reservoir section of the subterranean formation, wherein the LCM objects have permeable portions. The method includes flowing wellbore fluid from the wellbore through the permeable portions into the subterranean formation, and collecting solids from the wellbore fluid onto the LCM objects to stop or reduce flow of the wellbore fluid through permeable portions into the subterranean formation.

Yet another aspect relates to LCM that is a plurality of LCM objects, each LCM object of the plurality having a solid body with permeable sections including pores, wherein the plurality to arrange at a loss circulation zone in a wellbore in a subterranean formation to allow wellbore fluid to flow through the pores into the subterranean formation, and the plurality to collect solids from the wellbore fluid to form a flow barrier.

The details of one or more implementations are set forth in the accompanying drawings and the description below. Other features and advantages will be apparent from the description and drawings, and from the claims.

DETAILED DESCRIPTION

Figure 1:
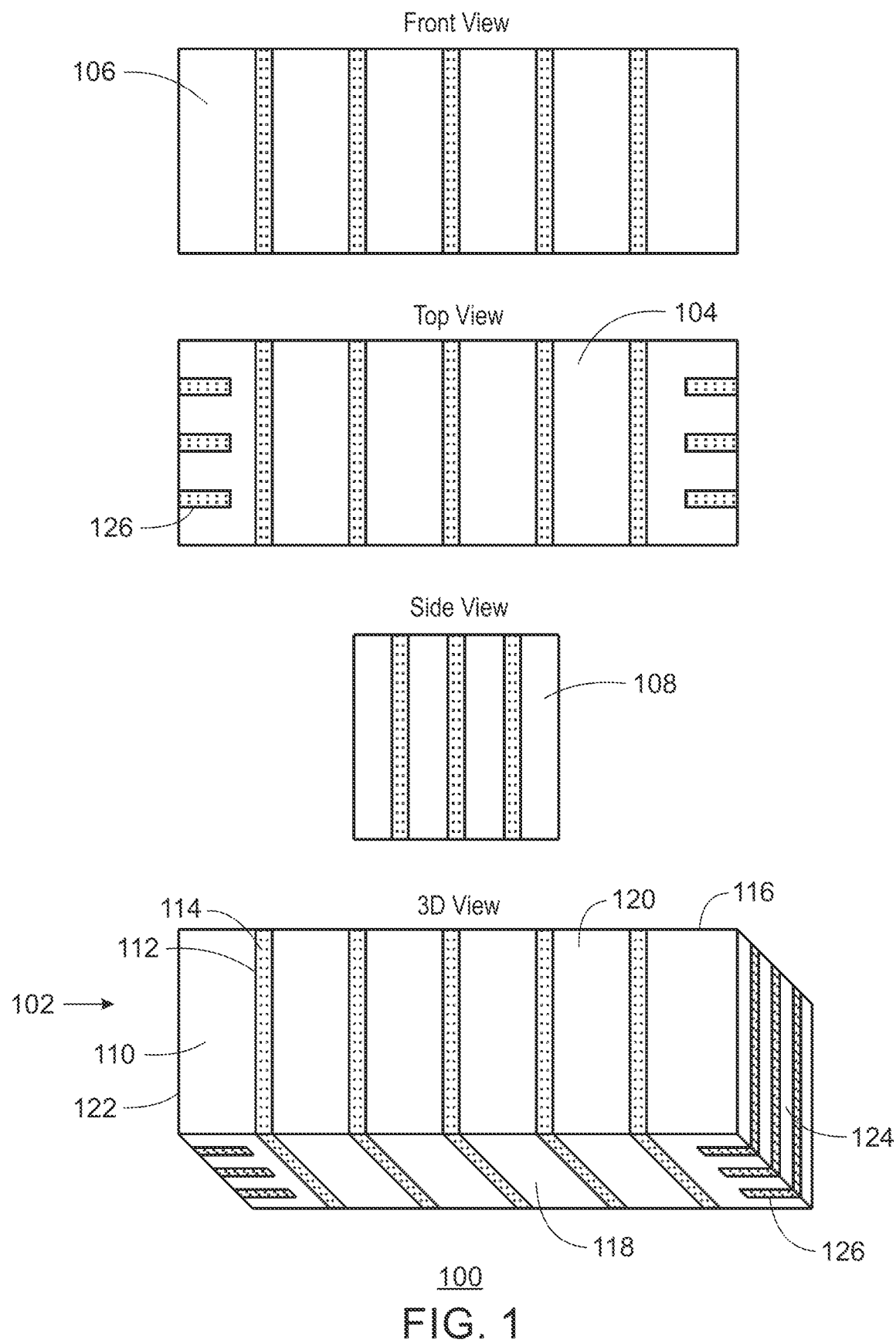
FIGS. 1-3 are diagrams of loss circulation material (LCM) objects.

Some aspects of the present disclosure are directed to loss circulation material (LCM) having sections that are porous and permeable. The sections may be part of a solid body and formed in grooves of the solid body. The LCM may be flaky LCM. The LCM may be applied to treating loss control (loss circulation) in a pay zone (hydrocarbon reservoir section). Therefore, as discussed below, the LCM may be characterized as reservoir friendly. The LCM may be applied to loss circulation zones having permeable features of the subterranean formation in a hydrocarbon reservoir section of the subterranean formation. The permeable features in the subterranean formation may be highly permeable. In one example, the highly permeable features may be labeled as a super-k zone capable of producing at least 500 barrels per day per foot of thickness. The present flaky LCM are applicable to permeable zones in the formation that cause loss circulation, such as during drilling, but where the permeable zones would provide for hydrocarbon production during the subsequent production phase.

In certain cases, drilling fluid employed in a hydrocarbon reservoir portion of the subterranean formation may be labeled as drill-in fluid. Drill-in fluid can be drilling fluid configured for drilling a borehole in a reservoir section, e.g., with intent to reduce damage to the formation and increase subsequent production of hydrocarbon. In some implementations, drill-in fluid can resemble a completion fluid. A drill-in fluid may include additives beneficial for filtration control and also carrying of rock cuttings, and the so forth.

Some embodiments relate to a flaky LCM having porous sections that may be part of a solid body, residing or formed in grooves or channels of the solid body. The flaky LCM is permeable to hydrocarbon flow from the subterranean formation into the wellbore through the porous sections. The flaky LCM can have a cube shape or other shapes and be made of polymer such as via additive manufacturing or three dimensional (3D) printing. In application, the flaky LCM are provided to the loss circulation zone in the wellbore (e.g., at a hydrocarbon reservoir section of the subterranean formation). Initially, drilling fluid flows through the flaky LCM porous portions into the subterranean formation. However, the pores are generally smaller than at least some of the solids in the drilling fluid. Consequently, solids (e.g., filler material, other LCMs, etc.) in the drilling fluid form a filter cake on the flaky LCM on the wellbore side and thus stop flow of drilling fluid through the flaky LCM porous sections into the formation. Once drilling is complete and hydrocarbon production started, the wellbore pressure is lower than the formation pressure. Therefore, produced hydrocarbon flows from the subterranean formation through the flaky LCM porous sections displacing the filter cake (on the wellbore side). Production from the subterranean formation may continue through the flaky LCM into the wellbore.

Conventional flaky LCMs are generally non-porous and impermeable. Hence, the mat or barrier formed by the flakes (conventional flaky LCM) in the loss zone of a reservoir section will generally permanently seal and block the highly-conductive fluid channels of the loss zones that would be beneficial to enhance well productivity. Conventional flaky LCM can have a significant detrimental impact on productivity of a well because the LCM obstructs permeable features (e.g., fractures, super-k channels, etc.) of the subterranean formation at the reservoir section.

In contrast, embodiments of the present flaky LCMs having porous and permeable channels that are smaller than the drill solid particles of the mud system may generally prevent or reduce the loss of whole mud while drilling but allow the production of hydrocarbon after completing a well. Embodiments of the present techniques include reservoir-friendly flaky LCMs containing porous and permeable channels that are small enough to prevent the loss of whole mud while drilling but large enough to allow the production of hydrocarbon after completion of a well. Embodiments of the present flaky LCM may be manufactured by additive manufacturing via a 3D printer. Other applicable manufacturing techniques may include, for example, casting (cast molding), injection molding, or compression molding. The manufacturing technique selected for implementation may be in response to LCM technical specifications for particular applications of the LCM.

Figure 2:
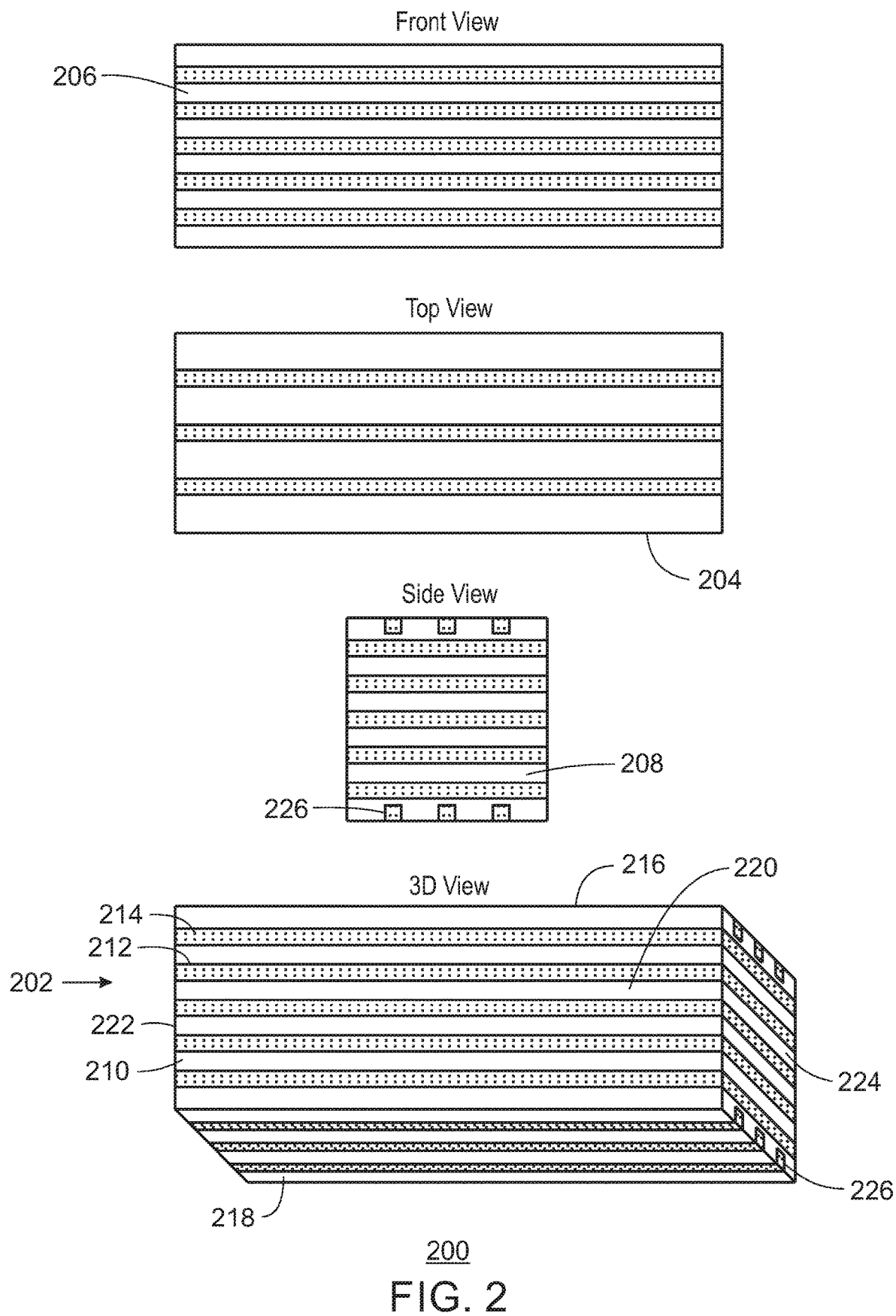
Figure 3:
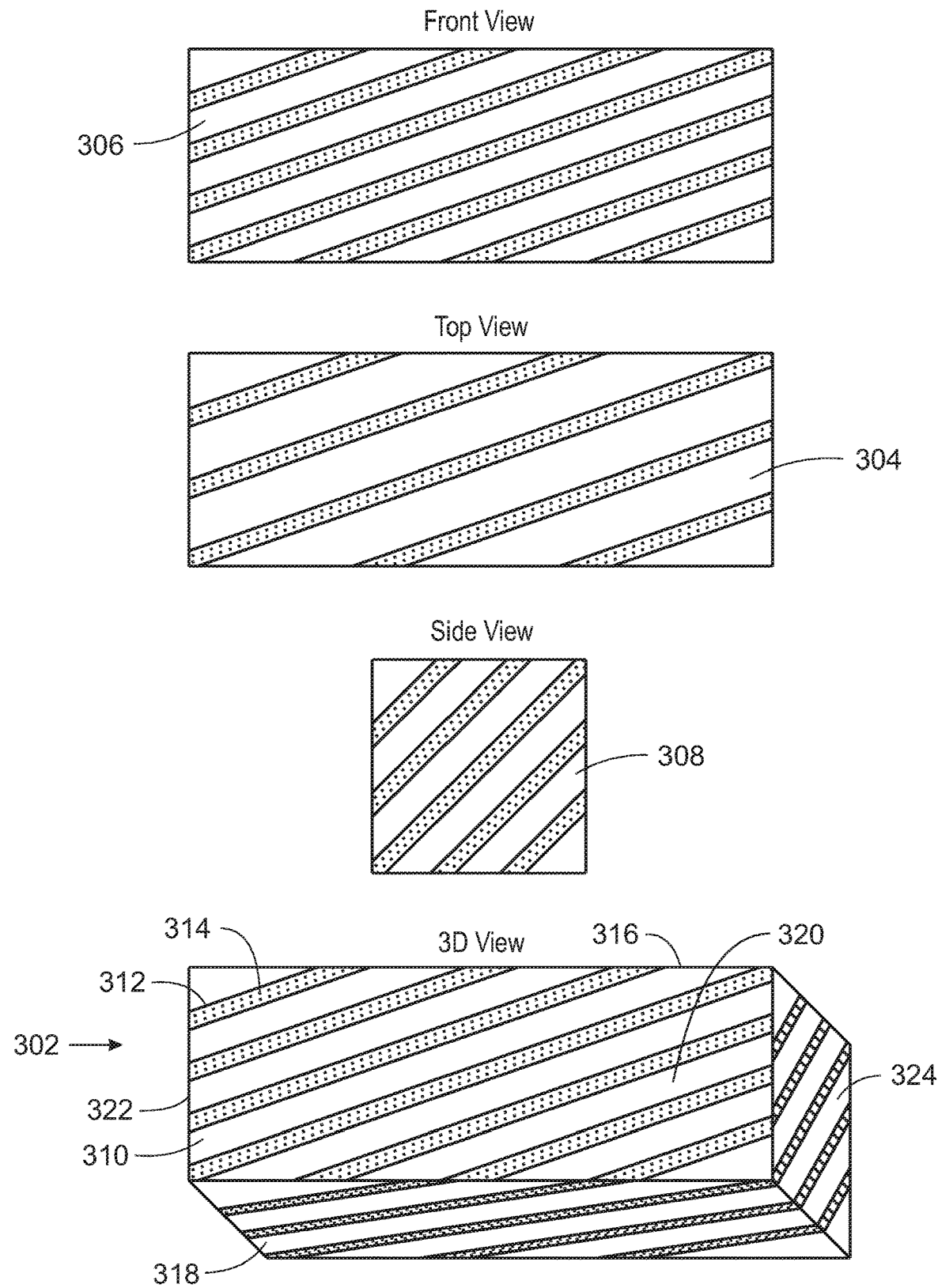

FIGS. 1-3 are examples of the present LCM, which may be flaky LCM or flake LCM. Flaky or flake LCM can be LCM objects having a relatively large ratio of surface area to volume. Flaky LCM can generally be insoluble to the mud system (drilling fluid or carrier fluid) in which the flaky LCM is employed. Flaky LCM can be utilized to seal fluid loss zones (loss circulation zones) in a well (wellbore) to aid in stopping or reducing lost circulation. Flake LCM can be applied in an LCM pill and pumped into the wellbore section where loss circulation is occurring. Other LCM types (e.g., granular, fiber, etc.) may be employed in the LCM pill with the flaky LCM.

FIGS. 1-3 each give a perspective view and approximate orthographic views of an LCM object of the present LCM. These examples of the present LCM objects depicted may be utilized in a plurality of the same or similar present LCM objects to give the LCM to treat loss circulation. The solid body 110, 210, 310 of the LCM object 100, 200, 300 in FIGS. 1-3, respectively, is a rectangular cuboid shape. Other embodiments of the LCM object have a solid body with a shape different than rectangular cuboid. The solid body can be a sphere, spheroid, ovoid, cuboid, rectangular cuboid, hyperrectangle, a pentahedron, or an irregular shape, and so on.

In FIGS. 1-3, the permeable sections 112, 212, 312 are elongated having a length substantially greater than their width. The length of the permeable sections 112, 212, 312 may depend on the size (e.g., distance or area) of the sides of the solid body 110, 210, 310. The permeable sections 112, 212, 312 may generally run across the respective side. The width of the permeable sections 112, 212, 312 may be, for example, less than 1 mm or less than 0.5 mm. The permeable sections 112, 212, 312 have a depth into the solid body 110, 210, 310, such as less than 4 mm, less than 3 mm, or less than 2 mm. A difference generally between the respective LCM object 100, 200, 300 of FIGS. 1-3 is orientation of the permeable sections with regard to the solid body 110, 210, 310.

FIG. 1 is the LCM object 100. Depicted are a perspective view 102, top view 104, front view 106, and side view 108. The LCM object 100 includes a solid body 110 having permeable sections 112 that include pores 114. In the illustrated example, the permeable sections 112 on four sides may be characterized as having a vertical orientation with respect to a given top and bottom (the remaining two sides). As mentioned, the solid body 110 is a rectangular cuboid in the illustrated embodiment. For implementations for the solid body 110, the length is in the range of 5 mm to 20 mm, or less than 30 mm, and the height and width are each in the range of 3 mm to 10 mm, or less than 10 mm. In one example, the L×H×W of the solid body 110 is 12 mm×5 mm×5 mm.

The illustrated example of the solid body 110 has two sides designated as top 116 (top view 104) and bottom 118, respectively, for reference (given or assigned) so to label the orientation (vertical in this example) of the permeable sections on the four remaining sides. In the illustrated embodiment, orientation of the permeable sections 112 on the four remaining sides may be characterized as vertical from top to bottom. In this example, the four remaining sides include the front 120 (front view 106), the back (not shown), and the two sides 122, 124 (side view 108) not the front or back. In examples, the back may generally be similar or identical to the front 120. In implementations, the two sides 122, 124 may be the same or similar. The orientation or arrangement of the permeable sections 112 on the top 116 and bottom 118 may be as depicted or as otherwise specified.

The number of permeable sections 112 at each of the top 116, bottom 118, front 102, and back may be at least 2, at least 3, at least 4, at least 5, or at least 6. In the illustrated embodiment, this number is 5. The number of permeable sections 112 for each of the two sides 122, 124 may be at least 1, at least 2, at least 3, or at least 4. In the illustrated embodiment, this number is 3. The spacing between permeable sections 112 on a given side may be, for example, less than 2.5 mm, less than 2 mm, less than 1.5 mm, less than 1 mm, or less than 0.5 mm. In the illustrated embodiment, this spacing is 1.5 mm on the top 116, bottom 118, front 120, and back, and is 0.75 mm on the two sides 122, 124.

The permeable sections 112 of the solid body 110 may be permeable portions of the solid body 110, porous sections of the solid body 110, porous portions of the solid body 110, permeable structures of or within the solid body 110, porous structures of or within the solid body 110, and the like. The permeable sections 112 may be generally part of the solid body 110 at or near the external surface of the solid body 110 and exposed to outside (external) of the solid body 110. The external surface of the permeable sections 112 may be an external surface of the solid body 110. The permeable sections 112 may be formed in recessed volumes such as grooves or channels. The exterior surface of the permeable sections 112 with respect to the exterior surface of the remaining part (portion) of the solid body 110 may be recessed, flushed (even), or protruding. As shown, the permeable sections 112 are elongated having a length substantially greater than their width. As discussed, the width of the permeable sections 112 may be, for example, less than 1 mm or less than 0.5 mm. The permeable sections 112 have a depth into the solid body 110. The depth may be, for example, less than 4 mm, less than 3 mm, or less than 2 mm. The depth for the permeable sections 112 on the side 124 is indicated by reference numeral 126.

The permeable sections 112 on one side may meet (interface and overlap) with permeable sections 112 on another side at where the two sides meet (at the edge between the two sides). For instance, in the example of FIG. 1, the permeable sections 112 on the front 120 meet the permeable sections 112 on the bottom 118 at the edge where the front 120 and bottom 118 meet. Such interface or overlap of permeable sections 112 between sides may advance fluid flow through the LCM as arranged at a loss circulation zone.

In the aforementioned example with the solid body 110 having dimensional values of 12 mm×5 mm×5 mm, the width of the permeable sections 112 is 0.5 mm and the depth of the permeable sections 112 is 2 mm. For the implementation depicted in FIG. 1, the number of permeable sections 112 on each of the top 116, bottom 118, front 120, and back is 5 with a spacing of 1.5 mm, and the number of permeable sections 112 on each side 122, 124 is 3 with a spacing of 0.75 mm.

For various embodiments, the pore size (e.g., width or diameter) of the pores 114 of the permeable sections 112 may be less than 100 microns, less than 50 microns, or less than 10 microns. The pore size may be specified to be less than the particle size of at least some of the solids in the wellbore fluid in the wellbore having the loss circulation zone being treated.

FIG. 2 is an LCM object 200 similar to the LCM object 100 of FIG. 1, but with a different orientation of permeable sections. FIG. 2 gives a perspective view 202, top view 204, front view 206, and side view 208 of the LCM object 200. The LCM object 200 includes a solid body 210 having permeable sections 212 including pores 214. In the example of FIG. 2, the permeable sections 212 on four sides may be characterized as having a horizontal orientation with respect to a given top and bottom (remaining two sides). The solid body 210 is a rectangular cuboid in the illustrated embodiment. In implementations, the solid body 210 may have the same or similar values for L×W×H dimensions as the solid body 110 of FIG. 1. The illustrated example of the solid body 210 has two sides assigned as top 216 and bottom 218, respectively, for reference (given) for labeling the orientation (horizontal in this example) of the permeable sections 212 on the four remaining sides. In the illustrated embodiment, orientation of the permeable sections 212 on these four remaining sides may be characterized as horizontal with respect to the top 216 and bottom 218. In this example, the four remaining sides include the front 220, the back (not shown), and the two sides 222, 224 not the front or back. In examples, the back may generally be similar or identical to the front 220. In implementations, the two sides 222, 224 may be the same or similar. The orientation or arrangement of the permeable sections 212 on the top 216 and bottom 218 may be as depicted or as otherwise specified.

The number of permeable sections 212 at each of the front 220, back, and two sides 222, 224 may be at least 2, at least 3, at least 4, at least 5, or at least 6. In the illustrated embodiment, this number is 5. The number of permeable sections 212 for each of top 216 and bottom 218 may be at least 1, at least 2, at least 3, or at least 4. In the illustrated embodiment, this number is 3. The spacing between permeable sections 212 on a given side may be, for example, less than 2.5 mm, less than 2 mm, less than 1.5 mm, less than 1 mm, or less than 0.5 mm. In the illustrated embodiment, this spacing is 1.5 mm on the front 220, back, and two sides 222, 224, and is 0.75 mm on the top 216 and the bottom 218.

The permeable sections 212 of the solid body 210 may be permeable portions, porous sections, porous portions, permeable structures, porous structures, and the like. The width or diameter of the pores 214 (e.g., same or similar to pores 114) may be, for example, less than 100 microns, less than 50 microns, or less than 10 microns. As with the permeable sections of FIG. 1, the permeable sections 212 may be generally part of the solid body 210 at or near the external surface of the solid body 210 and exposed to the outside (external) of the solid body 210 exterior. While the permeable sections 212 may be part of the solid body 210, the permeable sections 212 may be formed or reside in grooves or channels of the solid body 210. The exterior surface of the permeable sections 212 may be recessed, flushed (even), or protruding with respect to the exterior surface of the remaining part (portion) of the solid body 210. The elongated permeable sections 212 may have the same or similar dimensional (width, depth) values as the permeable sections 112 of FIG. 1. The depth for the permeable sections 212 on the bottom 218 is indicated by reference numeral 226. In one example, the solid body 210 has L×W×H of 12 mm×5 mm×5 mm, and in which the width of the permeable sections 212 is 0.5 mm and the depth of the permeable sections 212 is 2 mm.

Referring to FIGS. 1 and 2, a combination or mixture of multiple LCM objects 100 and multiple LCM objects 200 may be utilize together collectively as LCM to treat loss circulation. The LCM with LCM objects having differing respective orientations of the permeable sections may advance the intercoupling of the permeable sections for fluid flow there through with the LCM as arranged at the loss circulation zone. Thus the LCM may include a first set (group) of the flaky LCMs and second set (group) of the flaky LCMs with the first set having the same top designation as the second set, and wherein orientation of permeable sections in the first set is vertical from top to bottom, and orientation of permeable sections in the second set is horizontal with respect to top and bottom. Similarly, in examples, for a first group and second group of the flaky LCMs having the same top designation, the orientation of permeable sections in the first group is 90° different than the orientation of permeable sections in the second group.

For LCM having a collection or plurality of LCM objects including LCM objects 100 and LCM objects 200, embodiments can be characterized without specifying a top or bottom in particular for reference but instead noting a given side. For instance, for a given side in a first group (LCM objects 100) and second group (LCM objects 200) of the flaky LCMs, the orientation of the permeable sections 112 in the first group is substantially perpendicular to the orientation of the permeable sections 212 in the second group. Lastly, it should be noted in some examples with the solid body 110, 210 having the same dimensions and with L=W=H, the LCM object 100 and LCM object 200 may not be different or distinguishable.

FIG. 3 is an LCM object 300. Depicted are a perspective view 302, top view 304, front view 306, and side view 308. The solid body 310 is a rectangular cuboid. The LCM object 300 includes the solid body 310 having permeable sections 312 including pores 314. The permeable sections 312 on four sides may be characterized as having a slanted orientation (not horizontal and not vertical) with respect to a given top and bottom (remaining two sides). The permeable sections 312 on all six sides may be characterized as having an orientation that is parallel with a diagonal on the respective side. In implementations, the solid body 310 may have the same or similar values for L×W×H dimensions as the solid body 110 of FIG. 1 and the solid body 210 of FIG. 2. The illustrated example of the solid body 310 has two sides assigned as top 316 and bottom 318, respectively. The four remaining sides include the front 320, the back (not shown), and the two sides 322, 324 not the front or back. The back side may generally be similar or identical to the front 320. In implementations, the two sides 322, 324 may be the same or similar.

In the example of FIG. 3, the number of permeable sections 312 at each of the front 320 and the back may be, for example at least 4, at least 5, at least 6, at least 7, or at least 8. In the illustrated embodiment, this number is 7. The number of permeable sections 312 for each of top 316, bottom 318, and the two sides 322, 324 may be, for example, at least 3, at least 4, at least 5, or at least 6. In the illustrated embodiment, this number is 5. The spacing between permeable sections 312 on a given side may be, for example, less than 2.5 mm, less than 2 mm, less than 1.5 mm, less than 1 mm, or less than 0.5 mm. In the illustrated embodiment, this spacing is about 1 mm.

As indicated with respect to preceding figures, the permeable sections 312 of the solid body 310 may be permeable portions, porous sections, porous portions, permeable structures, porous structures, and the like. The width or diameter of the pores 314 (e.g., same or similar to pores 114 and pores 214) may be, for example, less than 100 microns, less than 50 microns, or less than 10 microns. As with the permeable sections of FIGS. 1-2, the permeable sections 312 may be part of the solid body 210 at or near the external surface of the solid body 310 and exposed to the outside (external) of the solid body 310 exterior. While the permeable sections 312 may be part of the solid body 310, the permeable sections 312 may be formed or reside in grooves or channels of the solid body 310. The exterior surface of the permeable sections 312 may be recessed, flushed (even), or protruding with respect to the exterior surface of the remaining part (portion) of the solid body 310. The elongated permeable sections 312 may have the same or similar width and same or similar depth as the permeable sections 112 of FIG. 1 and permeable sections 212 of FIG. 2. In one example, the solid body 310 has L×W×H of 12 mm×5 mm×5 mm, and in which the width of the permeable sections 312 is 0.5 mm and the depth of the permeable sections 312 is 2 mm.

Referring to FIGS. 1-3, a combination or mixture of multiple LCM objects 100, multiple LCM objects 200, and multiple LCM objects 300 may be utilize together collectively as LCM to treat loss circulation. The LCM with LCM objects having differing respective orientations of the permeable sections may advance the intercoupling of the permeable sections for fluid flow there through within the LCM as arranged at the loss circulation zone. The LCM may include a first set (group) of the flaky LCMs, second set (group) of the flaky LCMs, and a third set (group) of the flaky LCMs with the first set, second set, and third set having the same top designation, and wherein orientation of permeable sections in the first set is vertical from top to bottom, orientation of permeable sections in the second set is horizontal with respect to top and bottom, and orientation of permeable sections in the second set is slanted (not horizontal and not vertical) with respect to top and bottom. The orientation of permeable sections on the four sides (not the top and bottom) for the LCM objects in the first group may be 90° different than the orientation of permeable sections on the respective four sides (not the top and bottom) for the LCM objects in the second group. The orientation of permeable sections for the LCM objects in the third group for a given (corresponding) side may be 45° different than the orientation of permeable sections in the first and second groups for that given (corresponding) side.

For LCM having a collection or plurality of LCM objects including LCM objects 100 (first group), LCM objects 200 (second group), and LCM objects 300 (third group), embodiments can be characterized without specifying a top or bottom in particular for reference but instead noting a given side. For instance, for a given side in the first group (e.g., LCM objects 100) and the second group (e.g., LCM objects 200) of the flaky LCMs, the orientation of the permeable sections 112 in the first group is substantially perpendicular to the orientation of the permeable sections 212 in the second group. For that given side, the orientation of the permeable sections 312 in the third group (e.g., LCM objects 300) is 45° different than the first group and the second group. In other words, for the given side in the third group of the flaky LCMs, the orientation of the grooves is about 45° with respect to the orientation in the first and second groups.

Figure 4:
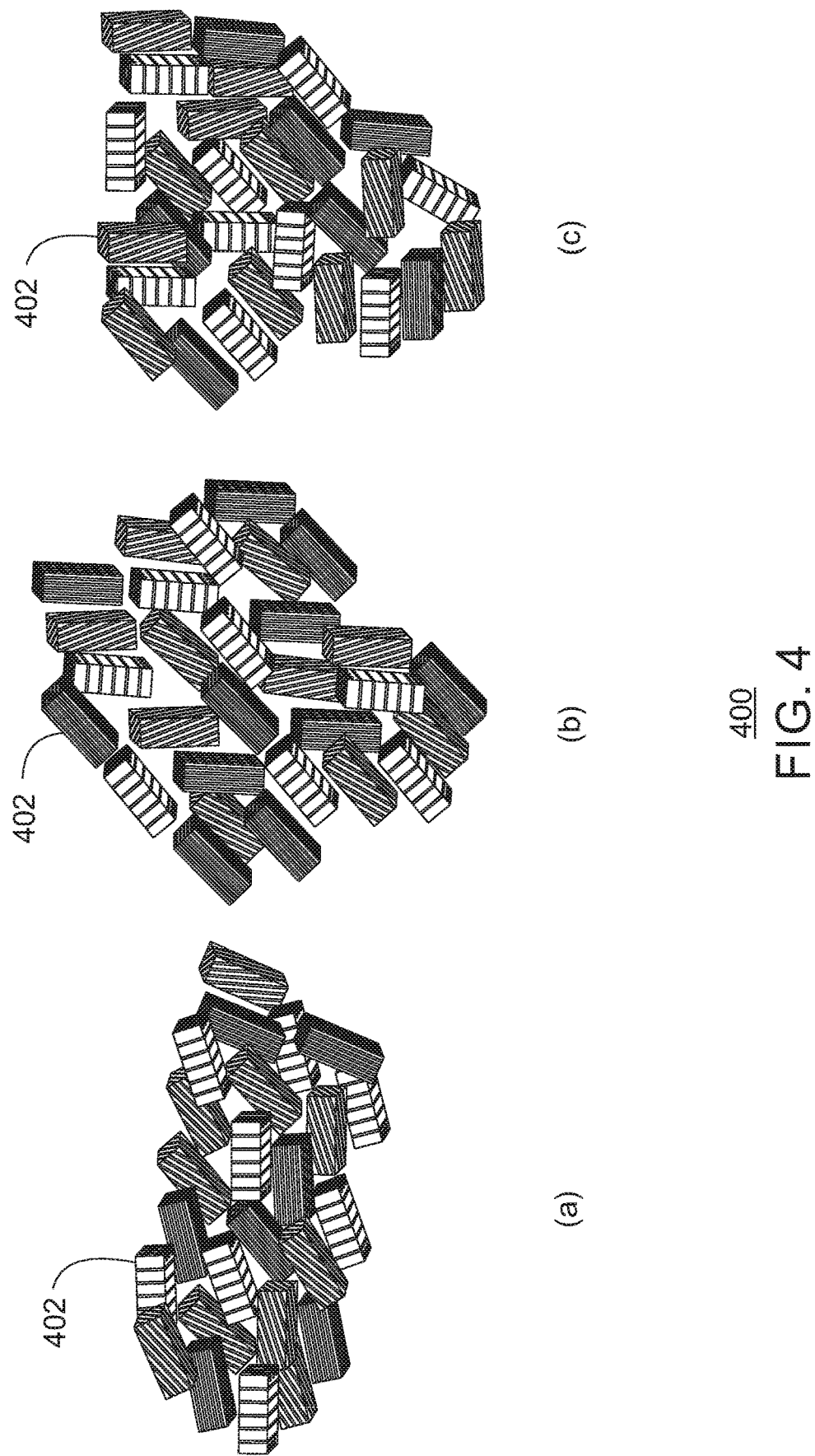
FIG. 4 are diagrams of LCM objects as arranged.

FIG. 4 is random arrangements 400 of flaky LCM objects 402. Three different random arrangements (a), (b), and (c) are depicted. The flaky LCM objects 402 may be analogous to the LCM object 100, LCM object 200, or LCM object 300, or any combinations thereof. The flaky LCM objects 402 may randomly arrange at a loss circulation zone. In some implementations, the loss circulation zone may be in a hydrocarbon reservoir section of the subterranean formation. The flaky LCM objects 402 may randomly arrange at, in, or over features (e.g., permeable portions, fractures, etc.) of the subterranean formation that contribute to loss circulation.

The LCM objects 402 as randomly arranged may allow wellbore fluid to flow through permeable sections (as intercoupled) of the LCM objects 402 into the subterranean formation. The pores of the permeable sections may be smaller than solids in the wellbore fluid. Therefore, the LCM objects 402 may collects solids from the wellbore fluid to form a flow barrier on the LCM objects 402 to stop or reduce flow of wellbore fluid (or drilling fluid) into the subterranean formation. A filter cake of the solids may form on the wellbore side of the LCM objects 402. Subsequently, when production of hydrocarbon (e.g., crude oil, natural gas, etc.) from the subterranean formation into the wellbore is initiated, the hydrocarbon may dislodge the collected solids or filter cake. Thus, the hydrocarbon may be produced through the permeable sections of the LCM objects 402 with the LCM object 402 remaining in place. In instances, some or majority of the LCM objects 402 may be displaced by the hydrocarbon.

Loss circulation may occur in drilling or cementing operations. In a drilling operation, drilling fluid may be pumped via mud pumps into a wellbore through a drill string to a drill bit (at the bottom of the wellbore) that breaks rock to drill the borehole. The drilling fluid may discharge from nozzles on the drill bit and flow back up through an annulus to Earth surface. The annulus may be between the wellbore wall (formation surface) and the drill string, or between the wellbore wall (formation) and wellbore casing in which the drill string is inserted. Some or all of the drilling fluid returning through the annulus to the Earth surface may be lost into the subterranean formation at the loss circulation zone in the wellbore.

In cementing, the cement slurry may be pumped from the Earth surface into the wellbore down the interior of the casing and then upward from the bottom through the annulus between the casing and the formation. When the cement reaches the loss circulation zone, the cement does not adequately continue upward. The loss of cement slurries to such thief zones can cause problems during cementing including resulting in inadequate amounts of cement slurry in the annulus between the casing and the subterranean formation. The inadequate amounts of cement slurry could lead to poor zonal isolation during the subsequent production of hydrocarbon from the subterranean formation through the wellbore to the Earth surface.

Figure 5:
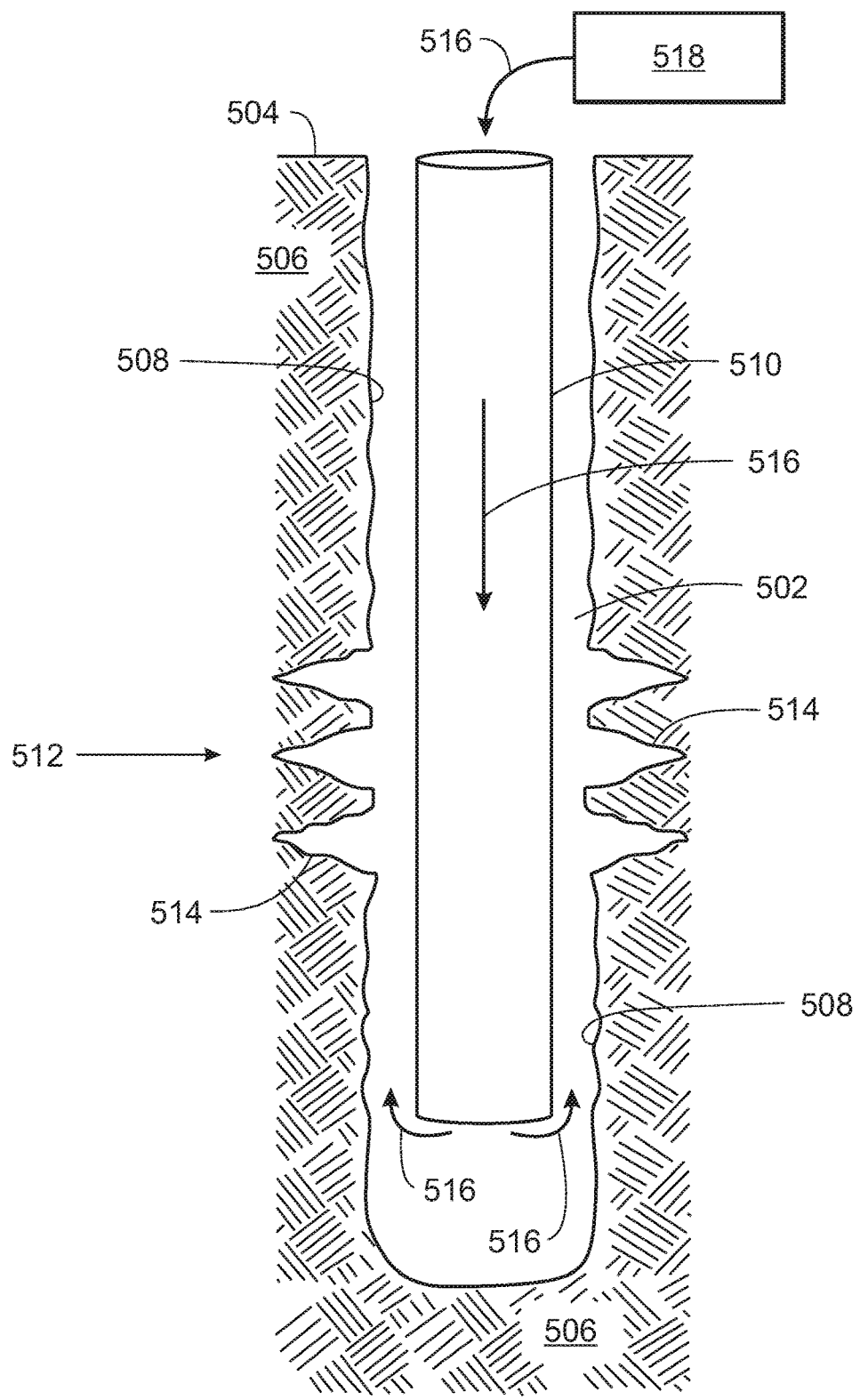
FIG. 5 is a diagram of a well site.

FIG. 5 is a well site 500 having a wellbore 502 through the Earth surface 504 into a subterranean formation 506 in the Earth crust. The subterranean 506 may also be labeled as a geological formation, hydrocarbon formation, reservoir, etc. Hydrocarbon may be produced from the subterranean formation 506 through the wellbore 502 to the surface 504. The hydrocarbon may be crude oil or natural gas, or both. To form the wellbore 502, a hole (borehole) is drilled into the subterranean formation 506 to generate a drilled formation surface 508 as an interface for the wellbore 502 with the subterranean formation 506. The formation surface 508 may be characterized as the wellbore 502 wall. The wellbore 502 may have openhole portions but generally includes a cylindrical casing 510 as shown. The wellbore 502 in the depicted implementation of FIG. 5 is a cased wellbore 502. In the illustrated embodiment, the wellbore 502 has a loss circulation zone 512 caused by loss-circulation features 514 of the subterranean formation 506 at that portion of the wellbore 502. The loss circulation zone 512 may be in a hydrocarbon reservoir section of the subterranean formation 506. The loss-circulation features 514 along the wellbore 502 at the loss circulation zone 512 cause or contribute to the loss circulation. The loss-circulation features 514 are structural features or characteristics of the subterranean formation 506 at or near the wellbore 502. The features 514 may be fractures, voids, vugulars (vugs), gaps, permeable channels, cavities, cavernous openings, etc. A vugular may be a cavity in subterranean rock and can be lined with mineral precipitates. The features 514 or feature 514 generally may be a permeable zone or unconsolidated portion of the subterranean formation 506. The loss circulation zone 512 may be a super-k zone capable of producing at least 500 barrels hydrocarbon per day per foot of thickness.

In a drilling operation, drilling fluid (mud) introduced from the surface 504 flowing downward through the casing 510 (and drill string) discharges from the drill bit (not shown) at the bottom of the wellbore 502, and flows upward through the annulus between the subterranean formation 506 and the casing 510 toward the surface 504 as return drilling fluid. Some or all of the drilling fluid flowing upward through the annulus may be lost through the features 514 (e.g., permeable zone or fractures) into the subterranean formation 506 at the loss circulation zone 512 in the wellbore 502.

For a cementing operation (e.g., primary cementing), the cement slurry may be introduced from the surface 504 into the casing 510 in the wellbore 502 and discharges from the bottom of the casing 510. The cement slurry then flows up through the annulus between the formation 506 and the casing 510 toward the surface 504. The cement slurry flowing upward in the annulus may be lost through the features 514 into the subterranean formation 506 at the loss circulation zone 512.

The present LCMs (e.g., FIGS. 1-4) discussed above may be utilized to treat the loss circulation zone 512 to cure the loss circulation. This LCM (having permeable sections) as randomly arranged at the loss circulation zone 512 may initially allow wellbore fluid to flow into the subterranean formation 506 but collect solids from the wellbore fluid to form a flow barrier. The formed flow barrier may reduce or prevent flow of drilling fluid or cement slurry through the features 514 (e.g., super-k zone) into the subterranean formation 506. The solids may be added to the treatment fluid along with the present LCM objects or the solids may added to the wellbore 502 after application of the present LCM objects.

A treatment fluid 516 having LCM that includes multiple LCM objects 100, 200, and/or 300 (FIGS. 1-3) or similar LCM objects may be introduced (e.g., pumped) into the wellbore 502. The treatment fluid 516 may be pumped by a surface pump (e.g., mud pump) of the surface equipment 518 at the surface 504. In certain implementations, the pump may be associated with a drilling rig. The pump(s) can be skid-mounted in some instances. The pump may be a centrifugal pump, positive displacement (PD) pump, reciprocating PD pump such as a piston or plunger pump, and so on. The surface equipment 518 may include equipment (e.g., vessels, solid-handling equipment, piping, pumps etc.) to incorporate LCM objects, viscosifier, and solids (e.g., filler material, bridging material, other LCM products, etc.) into the treatment fluid 516. The solids are in addition to present LCM objects. The surface equipment 518 may include equipment to support other operations at the well site 500.

The treatment fluid 516 may be, for example, drilling fluid (mud) or carrier fluid. The treatment fluid 516 may be oil-based or water-based. The treatment fluid 516 may include water, mineral oil, synthetic oil, a viscous additive (viscosifier), and so forth. The viscosifier may be, for example, bentonite, XC polymer, or starch for water-based treatment fluid 516. The viscosifier may be, for example, organophilic clay for oil-based treatment fluid 516. The treatment fluid 516 may be labeled as a treatment slurry in that the treatment fluid 516 includes the present LCM objects and optionally other solids. In implementations, the treatment fluid 516 having the LCM objects 100 may be labeled or characterized as an LCM pill. In general, a pill may be a relatively small quantity or volume (e.g., less than 500 barrels) of drilling fluid or carrier fluid as a specified blend utilized for a particular purpose in treating the wellbore 502 or subterranean formation 506.

The size and geometry of the present LCM objects included in the treatment fluid 516 may be specified in response to (correlative with) size (e.g., cross-sectional area) or permeability of the features 514 (e.g., permeable portion, fractures, gaps, channels, cavities, openings, etc.) of the subterranean formation 506 at the loss circulation zone 512. The concentration of the LCM objects 100 in the treatment fluid 216 may be, for example, in the range of 5 pounds per barrel (ppb) to 100 ppb, or at least 30 ppb. Additional solids (not the LCM objects 100) if included in the treatment fluid 216 may be, for example, as a concentration of less than 100 ppb in the treatment fluid 216.

In the downhole application, the present LCM product (e.g., LCM objects 100, 200, and/or 300) may randomly arrange at the features 514 to allow for flow of wellbore fluid through permeable sections of the LCM and thus collect solids from the wellbore fluid onto the LCM. The collection of solids may form a filter cake on the wellbore 502 side of the LCM to give a flow barrier in which flow may cease through the permeable sections from the wellbore 502 into the subterranean formation 506. The formed flow barrier may cure the loss circulation at the loss circulation zone. Subsequently, when hydrocarbon production from the subterranean formation 506 into the wellbore (to the Earth surface 504) is initiated, the flow of the hydrocarbon displaces the collected solids (e.g., filter cake). Thus, hydrocarbon production may flow through the permeable sections of the LCM as applied and arranged at the features 514. During production, the pressure of the subterranean formation 506 is greater than pressure in the wellbore 502. Such may provide motive force of flow of the hydrocarbon production and removal (via the hydrocarbon flow) of collected solids in or on the wellbore side of the LCM.

As indicated, additional solids (e.g., less than 100 ppb) may be added along with the present LCM objects (e.g., also less than 100 ppb) to the treatment fluid 516 at the surface 504. The combination of the present LCM objects and the additional solids may be less than 200 ppb in the treatment fluid 516. The added solids may include other LCM products as filler solids that can be collected by the present LCM (e.g., LCM objects 100, 200, and/or 300) to advance formation of the flow barrier. The added solids may generally include filler solids that may be labeled as filler material or bridging material. In application, the filler solids as particles suspended in the treatment fluid 516 may be collected present LCM as random arranged at the lost circulation zone 512. The filler solids may include small particles having, for example, an effective diameter less than 2 mm in effective diameter down to micron scale (e.g., 100 microns). The filler solids may include volcanic ash (generally non-swelling), bentonite (generally swelling), Rev Dust™ (generally non-reactive), ARC Plug or Nut plug (both known as bridging material), and the like. A blend design may be implemented in which two or more blends of the additives may be prepared in advanced, and then added to the treatment fluid 516 at the surface 504 at the time of application. In some embodiments, a single sack for the LCM pill system may be implemented in which the present LCM objects and optionally other aforementioned additives are pre-mixed and added to the drilling mud (or carrier fluid) to give the treatment fluid 516. Such may save time, and accelerate the mixing process and improve the slurry quality. Single sack typically has all the components in one sack so that contents can be mixed at the same time at the same rate by pouring a single sack into, for example, the mud mixing hopper.

Embodiments of the present flaky LCM may be manufactured by additive manufacturing via a 3D printer. The additive manufacturing may be, for example, fused deposition modeling (FDM) or other types of 3D printing. For a fabrication system having the 3D printer, the computer model driving the 3D printer may be configured or set (programmed) to form LCM having the solid body (specified size) with permeable sections. The number and placement of the permeable sections, as well as the pore sizes, are specified. The 3D material may be polymer or metal. Thus, the present LCM (e.g., LCM objects 100, 200, 300) may be polymer or metal. Other applicable manufacturing techniques may include, for example, machining (subtractive manufacturing) or molding. Molding may include, for example, casting (cast molding), injection molding, or compression molding. The fabrication system may include, for example, an injection mold, to receive a material (for example, a polymer) to form the LCM objects 100, 200, 300. For the implementation of the fabrication system having an injection mold, the mold may be shaped in the form of the solid body (specified size) having permeable sections (number and placement designated) with specified pore size. The manufacturing practice selected for implementation may be in response to LCM technical specifications for particular applications of the LCM. The present methods disclosed herein may include fabricating the LCM objects via 3D printing or other techniques.

Figure 6:
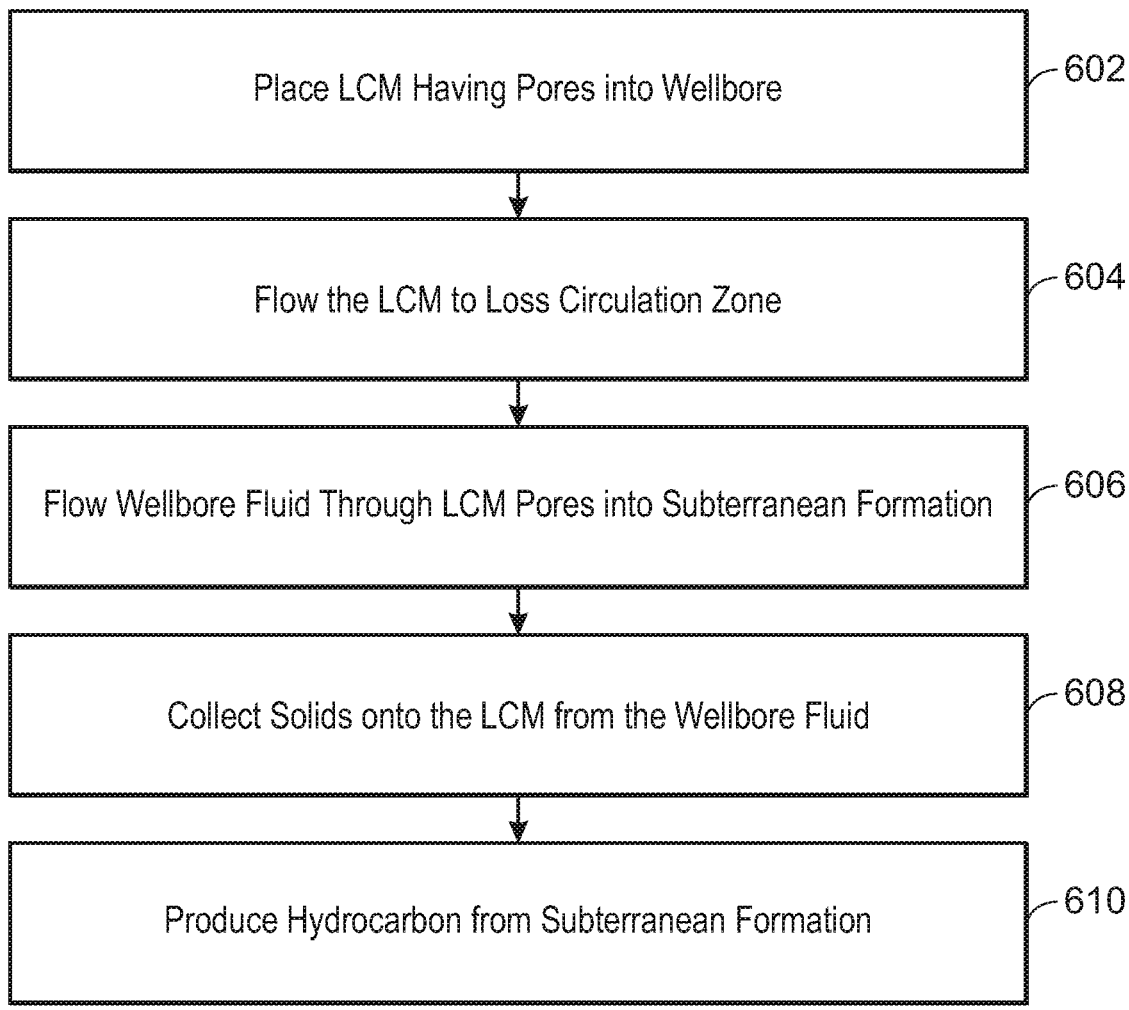
FIG. 6 is a block flow diagram of a method of treating loss circulation in a wellbore in a subterranean formation.

FIG. 6 is a method 600 of treating loss circulation in a wellbore in a subterranean formation. At block 602, the method includes placing LCM (e.g., flaky LCM) having pores into the wellbore. The LCM may have permeable sections having the pores. The placing of the LCM into the wellbore may involve pumping fluid having the LCM into the wellbore. The fluid may be, for example, drilling fluid (drilling mud) or carrier fluid. In some embodiments, concentration of the LCM in the fluid is less than 100 ppb. The fluid pumped into the wellbore may include solids in addition to the LCM. The solids may include bridging material, filler material, or other LCM product not the LCM, or any combinations thereof.

At block 604, the method includes flowing the LCM to dispose the LCM against the subterranean formation at a loss circulation zone in the wellbore. The flowing of the LCM may involve flowing the LCM to dispose the LCM at features of the subterranean formation that contribute to loss circulation at the loss circulation zone. The LCM may randomly arrange at features of the loss circulation zone such that wellbore fluid can initially flow through the LCM pores into the subterranean formation. In certain implementations, the loss circulation zone is at a hydrocarbon reservoir section of the subterranean formation.

At block 606, the method includes flowing wellbore fluid from the wellbore through the pores into the subterranean formation. The flowing of the wellbore fluid through the pores may involve allowing loss of wellbore fluid through the pores into the subterranean formation at the loss circulation zone. The wellbore pressure may generally be greater than the subterranean formation pressure. The wellbore pressure may be provided via a surface pump.

At block 608, the method includes collecting solids onto the LCM from the wellbore fluid flowed through the pores to form a barrier (e.g., flow barrier) to treat the loss circulation at the loss circulation zone. To treat the loss circulation may involve to stop or reduce flow of the wellbore fluid into the subterranean formation at the loss circulation zone. The flow of the wellbore fluid through the pores into the subterranean formation may be stopped or reduced due to formation of the barrier. The pores may generally be smaller than the solids particles. The collecting of the solids may foul the pores. To form the barrier may involve the collecting of the solids fouling the pores. The collecting of the solids may form a filter cake of the solids on a wellbore side of the LCM. In implementations, the collecting of the solids forms the barrier as a flow barrier across or over the pores. The solids may include, for example, bridging material, filler material, or other LCM product not the LCM, or any combinations thereof.

At block 610, the method includes producing hydrocarbon from the subterranean formation. The hydrocarbon may be, for example, crude oil or natural gas, or both. The production of the hydrocarbon may involve flowing the hydrocarbon from the subterranean formation through the LCM pores into the wellbore. The flowing of the hydrocarbon through the pores removes at least a portion of the solids collected on the LCM.

Figure 7:
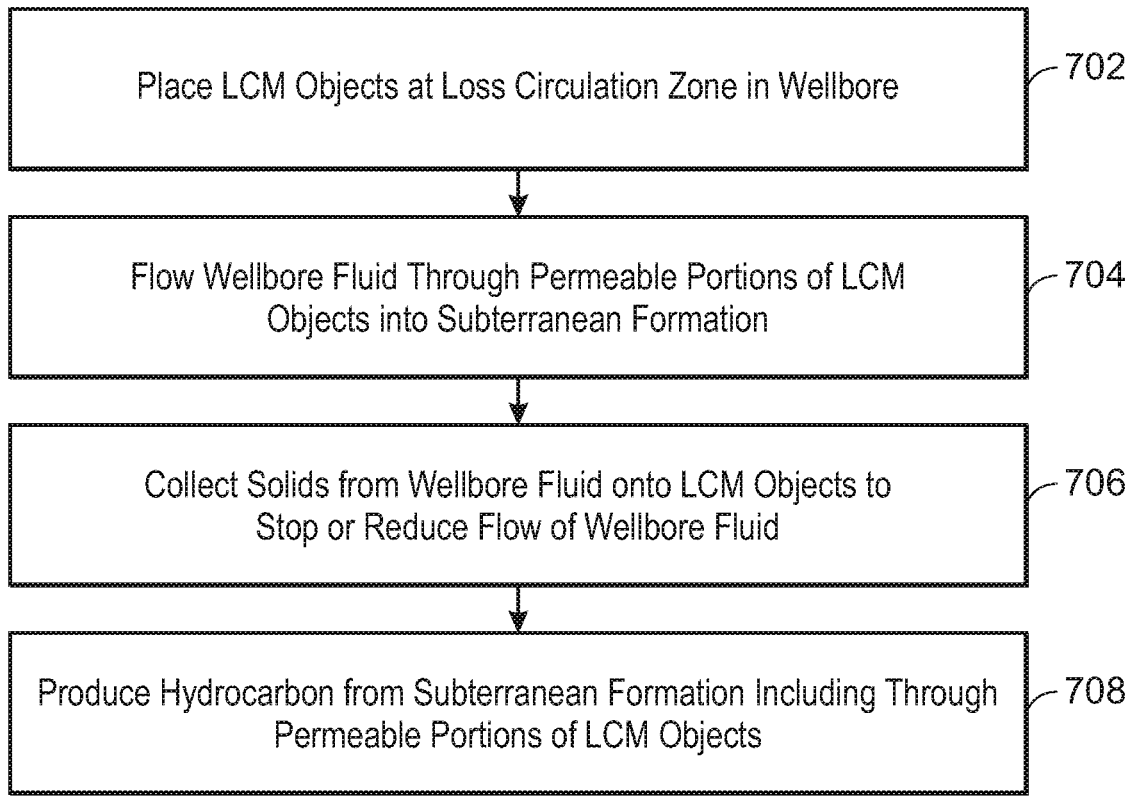
FIG. 7 is a block flow diagram of a method of treating loss circulation in a wellbore in a subterranean formation.

FIG. 7 is a method 700 of treating loss circulation in a wellbore in a subterranean formation utilizing LCM that is multiple LCM objects (e.g., flaky LCM). The LCM objects have permeable portions (e.g., having pores). Each LCM object of the LCM objects may have a solid body having the permeable portions. In some examples, each solid body has at least five permeable portions. The LCM objects may be, for example, polymer or metal. In some implementations, the method may include fabricating the LCM objects by additive manufacturing (3D printing).

At block 702, the method includes positioning the LCM objects at a loss circulation zone in the wellbore at a hydrocarbon reservoir section of the subterranean formation. The positioning the LCM objects may involve placing the LCM objects from Earth surface into the wellbore and flowing the LCM objects in the wellbore to the loss circulation zone.

At block 704, the method includes flowing wellbore fluid from the wellbore through the permeable portions into the subterranean formation. The motive force for flow of the wellbore fluid may be pressure differential with wellbore pressure greater than pressure of the subterranean formation.

At block 706, the method includes collecting solids from the wellbore fluid onto the LCM objects to stop or reduce flow of the wellbore fluid through permeable portions into the subterranean formation. For the permeable portions having pores, the solids may be larger than the pores.

At block 708, the method may include producing hydrocarbon from the subterranean formation. The producing of the hydrocarbon may involve flowing the hydrocarbon from the subterranean formation through the permeable portions into the wellbore. The flowing of the hydrocarbon through the pores may dislodge the solids collected onto the permeable portions of the LCM objects.

Figure 8:
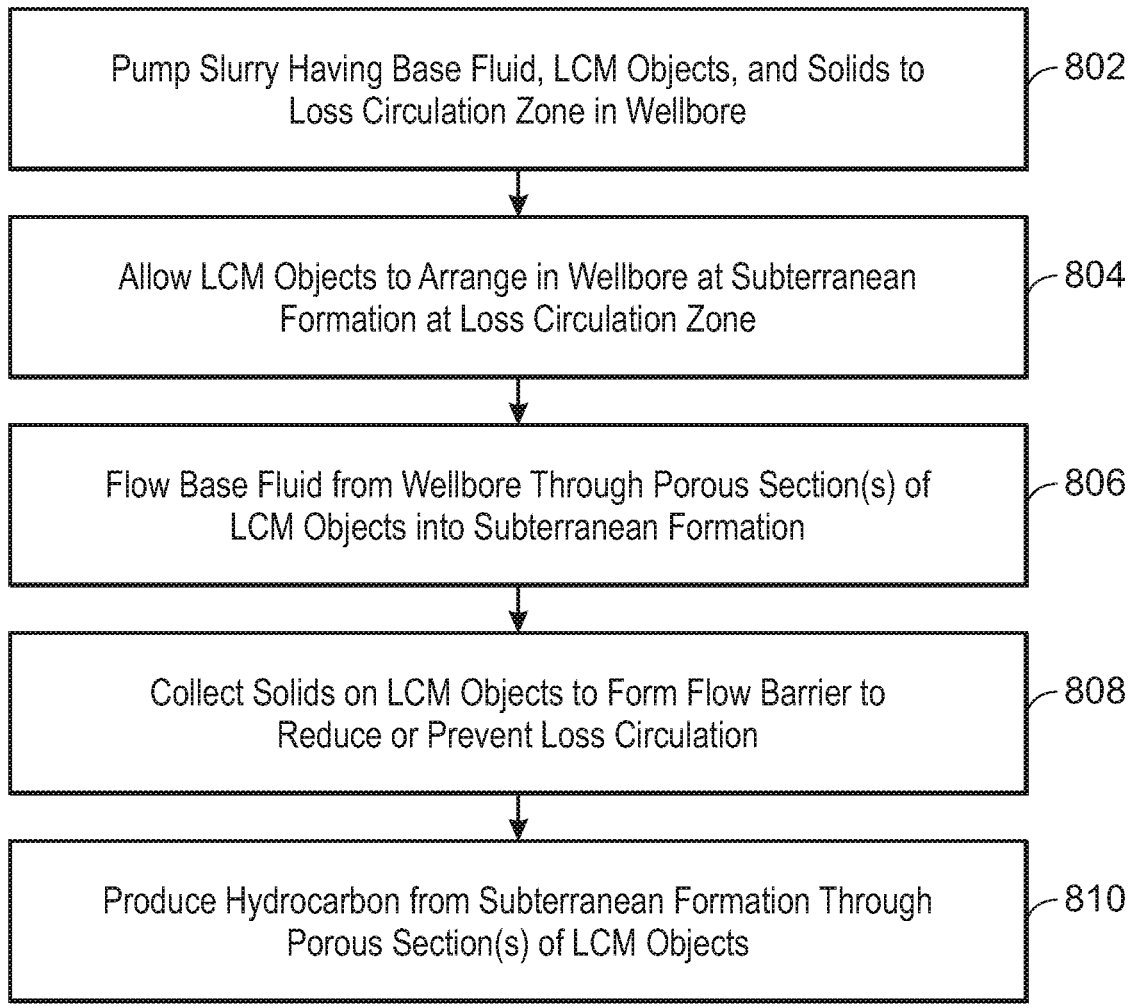
FIG. 8 is a method of applying LCM to a wellbore in a subterranean formation.

FIG. 8 is a method 800 of applying LCM to a wellbore in a subterranean formation. The LCM includes LCM objects that may be, for example, polymer or metal.

At block 802, the method includes pumping a slurry having base fluid, LCM objects, and solids into the wellbore to a loss circulation zone in the wellbore. The base fluid may be, for example, drilling fluid or a carrier fluid. The LCM objects each have a porous section(s). The LCM objects may each generally have multiple porous sections. Each LCM object of the LCM objects may have a solid body (e.g., cuboid shape) having the porous section(s) embedded therein. The porous section(s) may be exposed to external of the solid body.

At block 804, the method includes allowing the LCM objects to arrange (e.g., randomly) in the wellbore at the subterranean formation at the loss circulation zone. The porous section of each LCM object of the LCM objects may be multiple porous sections disposed in respective grooves of the LCM object. Some of the porous sections may intercouple in the arrangement for fluid flow there through.

At block 806, the method includes flowing the base fluid from the wellbore through the porous section(s) of at least some of the LCM objects into the subterranean zone. In certain examples, the porous section of each LCM object of the LCM objects have at least five porous sections spaced apart with respect to each other At block 808, the method includes collecting the solids on the LCM objects to form a flow barrier to reduce or prevent loss circulation at the loss circulation zone. The porous sections may have pores, and wherein the pores are smaller than the solids.

At block 810, the method may include producing hydrocarbon from the subterranean formation, wherein producing the hydrocarbon involves flowing the hydrocarbon from the subterranean formation through porous section(s) of the LCM objects into the wellbore. The hydrocarbon flow through the porous section(s) may displace at least a portion of the solids collected on the LCM objects.

An embodiment is a method of applying LCM to a wellbore in a subterranean formation, the method including: pumping a slurry comprising base fluid, LCM objects, and solids into the wellbore to a loss circulation zone in the wellbore, the LCM objects each comprising a porous section; allowing the LCM objects to arrange in the wellbore at the subterranean formation at the loss circulation zone; flowing the base fluid from the wellbore through the porous section of at least some of the LCM objects into the subterranean zone; and collecting the solids on the LCM objects to form a flow barrier to reduce or prevent loss circulation at the loss circulation zone. Each LCM object of the LCM objects may include a solid body having the porous section, wherein the solid body includes a cuboid shape having the porous section embedded therein, and wherein the porous section is exposed to external of the solid body. The porous section of each LCM object of the LCM objects may include multiple porous sections disposed in respective grooves of the LCM object, and wherein the LCM objects include polymer or metal. In implementations, the porous section of each LCM object of the LCM objects is at least five porous sections spaced apart with respect to each other, wherein the five porous sections have pores, and wherein the pores are smaller than the solids. The method may include producing hydrocarbon from the subterranean formation, wherein producing the hydrocarbon involves flowing the hydrocarbon from the subterranean formation through the porous section into the wellbore, and wherein flowing the hydrocarbon through the porous section displaces at least a portion of the solids collected on the LCM objects.

Another embodiment is a plurality of LCM objects, each LCM object of the plurality having a solid body (e.g., cuboid shape) having permeable sections including pores, wherein the plurality of LCM objects to arrange at a loss circulation zone in a wellbore in a subterranean formation to initially allow wellbore fluid to flow through the pores into the subterranean formation, and the plurality of the LCM objects to collect solids from the wellbore fluid to form a flow barrier. The plurality of LCM objects as arranged to intercouple permeable sections among the plurality at the loss circulation zone, and wherein the pores are smaller than the solids. The plurality of LCM objects may be flaky LCM. Each LCM object of the plurality may be polymer or metal. In implementations, each LCM object of the plurality has at least five permeable sections. The plurality of LCM objects may include a first set of the LCM objects having a first orientation of the permeable sections, and a second set of the LCM objects having a second orientation of the permeable sections different than the first orientation. The LCM permeable sections of the solid body of each LCM object of the plurality may be disposed at are near an external surface of the solid body. The permeable sections may be elongated and have depth into the solid body. In some implementations, the solid body has a length less than 30 mm, a height less than 10 mm, and a width less than 10 mm. The permeable sections of the solid body of each LCM object of the plurality may be spaced apart. The plurality of LCM objects may be fabricated by additive manufacturing (3D printing).

Tables 1-4 below give Examples of treatment fluids that may deploy the present LCM (e.g., FIGS. 1-4). The present LCM can be shaped LCM having permeable sections. The treatment fluids (Tables 1-4) are indicated as drill-in fluids and may be altered at least with respect to incorporating the present LCM. While drill-in fluid is noted, treatment fluids as indicated in Tables 1-4 may be drilling fluid more generally or a carrier fluid. The treatment fluids may have an aqueous fluid phase or a non-aqueous fluid phase. The aqueous phase can be fresh water, monovalent salt water, or divalent salt water, and so forth. The non-aqueous phase can be, for example, mineral oil or synthetic oil, and the like. As indicated in Tables 1-4, Examples of the treatment fluid (e.g., drill-in fluid) can include a viscosifier, a fluid loss additive, and calcium carbonate (CaCO3). The CaCO3 can be granular as coarse particles (C), medium particles (M), or fine particles (F), or any combinations thereof. The viscosifier can be, for instance, a polysaccharide (e.g., xanthan gum or XC polymer), a carboxymethyl cellulose (CMC), or a cellulose derivative (e.g., polyanionic cellulose or PAC), or any combinations thereof. The fluid loss additive can be, for example, starch, psyllium husk powder, or a polyanionic cellulose polymer (e.g., PAC LV™ available from AMC Drilling Optimisation of Balcatta, Western Australia, Australia), or any combinations thereof. The present LCM (e.g., shaped LCM with permeable sections) can be, for example, 10-30 pounds/barrel of the altered drill-in fluid. The units in Tables 1-4 below are cubic centimeter (cc) or grams (g). The volumes of the water (fresh water or salt water) (Tables 1-3) are given as a reference basis with respect to the associated remaining components in the given Table. The volumes of the oil (mineral oil or synthetic) in Table 4 are given as a basis with respect to the associated remaining components in Table 4.

TABLE 1

Fresh Water-Based Altered Drill-In Fluid System

| Components | Quantity | Range |
| --- | --- | --- |
| Fresh Water (cc) | 331 | 250-400 |
| XC Polymer (g) | 1.5 | 0.5-3.5 |
| Modified Starch (g) | 6 | 2-10 |
| Biocide (cc) | 0.5 | <1 |
| NaOH (g) | 0.3 | <0.8 |
| CaCO3, F (g) | 20 | 5-40 |
| CaCO3, M (g) | 10 | 3-30 |
| CaCO3, C (g) | 5 | <10 |
| Shaped LCMs with Permeable Sections (g) | 15 | 5-40 |

TABLE 2

Monovalent Salt Water-Based Altered Drill-In Fluid System

| Components | Quantity | Range |
| --- | --- | --- |
| Water (cc) | 296 | 220-380 |
| NaCl (g) | 75 | 50-100 |
| XC Polymer (g) | 1.5 | 0.5-3.5 |
| Modified Starch (g) | 6 | 2-10 |
| Biocide (cc) | 0.5 | <1 |
| NaOH (g) | 0.3 | <0.8 |
| CaCO3, F (g) | 20 | 5-40 |
| CaCO3, M (g) | 10 | 3-30 |
| CaCO3, C (g) | 5 | <10 |
| Shaped LCMs with Permeable Sections (g) | 15 | 5-40 |

TABLE 3

Divalent Salt Water-Based Altered Drill-In Fluid System

| Components | Quantity | Range |
| --- | --- | --- |
| Water (cc) | 287 | 200-350 |
| CaCl$_2$ (g) | 100 | 50-150 |
| XC Polymer (g) | 1.5 | 0.5-3.5 |
| Modified Starch (g) | 6 | 2-10 |

TABLE 3-continued

Divalent Salt Water-Based Altered Drill-In Fluid System

| Components | Quantity | Range |
| --- | --- | --- |
| Biocide (cc) | 0.5 | <1 |
| NaOH (g) | 0.3 | <0.8 |
| CaCO3, F (g) | 20 | 5-40 |
| CaCO3, M (g) | 10 | 3-30 |
| CaCO3, C (g) | 5 | <10 |
| Shaped LCMs with Permeable Sections (g) | 15 | 5-40 |

TABLE 4

Non-Aqueous Drill-In Fluid System (Mineral Oil or Synthetic Oil)

| Components | Mineral Oil-Based Mud | Mineral Oil-Based Mud | Synthetic Oil-Based Mud | Synthetic Oil-Based Mud |
| --- | --- | --- | --- | --- |
| Base Oil (cc) | 186 | 150-220 | 186 | 150-220 |
| Invermul (cc) | 10 | 5-15 | 10 | 5-15 |
| EZ-mul (cc) | 6 | <10 | 6 | <10 |
| Lime (gm) | 5 | <9 | 5 | <9 |
| Viscosifier (g) | 6 | 2-10 | 6 | 2-10 |
| Fluid Loss Additive (g) | 7 | 3-12 | 7 | 3-12 |
| Water (cc) | 84 | 50-120 | 84 | 50-120 |
| CaCl$_2$ (g) | 61 | 20-100 | 61 | 20-100 |
| CaCO$_3$ F (g) | 25 | 10-40 | 65 | 40-90 |
| CaCO$_3$ M (g) | 20 | 5-35 | 65 | 40-90 |
| CaCO$_3$ C (g) | 15 | 3-30 | 65 | 40-90 |
| Shaped LCMs with Permeable Sections (g) | 15 | 5-25 | 15 | 5-25 |

A number of implementations have been described. Nevertheless, it will be understood that various modifications may be made without departing from the spirit and scope of the disclosure.

What is claimed is:

1. A method of treating loss circulation in a wellbore in a subterranean formation, the method comprising:
   placing loss circulation material (LCM) objects into the wellbore, each LCM object comprising a solid body that is a rectangular cuboid shape having a top, a bottom, and four sides, wherein the solid body comprises permeable sections, each permeable section comprising pores, each permeable section comprising a length greater than its width, and wherein the permeable sections on a given side of the four sides are spaced apart;
   specifying that the LCM objects comprise a first set of the LCM objects comprising a first orientation of the permeable sections along the four sides with respect to the top and the bottom and a second set of the LCM objects comprising a second orientation of the permeable sections along the four sides with respect to the top and the bottom different than the first orientation to advance fluid flow through the LCM objects as arranged at a loss circulation zone in the wellbore;
   flowing the LCM objects to dispose the LCM objects against the subterranean formation at the loss circulation zone in the wellbore, wherein the LCM objects comprise the first set and the second set;
   flowing wellbore fluid from the wellbore through the permeable sections comprising the pores into the subterranean formation; and collecting solids onto the LCM objects from the wellbore fluid flowed through the permeable sections comprising the pores to form a barrier to treat the loss circulation at the loss circulation zone.

2. The method of claim 1, wherein the first orientation along the length of the permeable sections is parallel to the top and the bottom, wherein the second orientation along the length of the permeable sections is perpendicular to the top and the bottom, wherein the solid body comprise a length less than 30 millimeters (mm), a height less than 10 mm, and a width less than 10 mm, wherein pore size of the pores comprises less than 100 microns, wherein the solid body comprises multiple permeable sections, wherein each permeable section comprises multiple pores, wherein flowing the LCM objects comprises flowing the LCM objects to dispose the LCM objects at features of the subterranean formation that contribute to loss circulation at the loss circulation zone, and wherein the loss circulation zone is at a hydrocarbon reservoir section of the subterranean formation.

3. The method of claim 1, wherein the first orientation is 90° different than the second orientation, wherein flowing the wellbore fluid through the permeable sections comprising the pores comprises allowing loss of wellbore fluid through the pores into the subterranean formation at the loss circulation zone, and wherein to form the barrier comprises the collecting of the solids, wherein the collecting of the solids fouls the pores.

4. The method of claim 1, wherein the first orientation comprises a lengthwise vertical orientation with respect to the top and the bottom, wherein the second orientation comprises a lengthwise horizontal orientation with respect to the top and the bottom, wherein width of the permeable sections is less than 1 mm, wherein the permeable sections are exposed to outside of the solid body, wherein depth of the permeable sections into the solid body is less than 4 mm, wherein placing the LCM objects into the wellbore comprises pumping fluid having the LCM objects into the wellbore, wherein the fluid comprises drilling fluid or carrier fluid, and wherein concentration of the LCM objects in the fluid is less than 100 pounds per barrel (ppb).

5. The method of claim 1, wherein the first orientation perpendicular to the second orientation, wherein the fluid pumped into the wellbore comprises the solids, wherein the solids comprise bridging material or filler material, or both, wherein collecting the solids fouls the pores, wherein flow of the wellbore fluid through the permeable sections comprising the pores into the subterranean formation is stopped or reduced due to formation of the barrier.

6. The method of claim 1, wherein the first orientation is vertical along the length of the permeable sections on the four sides with respect to the top and the bottom, wherein the second orientation is horizontal along the length of the permeable sections on the four sides with respect to the top and the bottom, wherein the first orientation is 90° different than the second orientation, wherein the pores are smaller than the solids, wherein to treat the loss circulation comprises to stop or reduce flow of the wellbore fluid into the subterranean formation at the loss circulation zone, and wherein collecting the solids forms the barrier as a flow barrier across the pores.

7. The method of claim 1, wherein the first orientation is 45° different than the second orientation, wherein the solids comprise bridging material or filler material, or both, wherein collecting the solids forms a filter cake of the solids on a wellbore side of the LCM objects, and wherein the barrier comprises a flow barrier.

8. The method of claim 1, comprising producing hydrocarbon from the subterranean formation, wherein producing the hydrocarbon comprises flowing the hydrocarbon from the subterranean formation through the permeable sections comprising the pores into the wellbore, wherein flowing the hydrocarbon through the permeable sections comprising the pores removes at least a portion of the solids collected on the LCM objects, wherein in the first set the permeable sections along the four sides of the solid body do not meet on a same solid body, and wherein in the second set the permeable sections along the four sides of the solid body meet respectively at edges between the four sides of the same solid body.

9. A method of treating loss circulation in a wellbore in a subterranean formation, the method comprising:
positioning loss circulation material (LCM) objects at a loss circulation zone in the wellbore at a hydrocarbon reservoir section of the subterranean formation, wherein the LCM objects each comprise a rectangular cuboid body having a top, a bottom, and four sides, the rectangular cuboid body having permeable portions, each permeable portion having pores and a length greater than its width, wherein the permeable portions on a given side of the four sides are spaced apart, wherein a first set of the LCM objects comprise a first orientation of the permeable portions along the four sides with respect to the top and the bottom, and wherein a second set of the LCM objects comprise a second orientation of the permeable portions along the four sides with respect to the top and the bottom;
flowing wellbore fluid from the wellbore through the permeable portions into the subterranean formation;
advancing, via the first orientation being different than the second orientation, intercoupling of the permeable portions for fluid flow through the permeable portions with the LCM objects as arranged at the loss circulation zone; and
collecting solids from the wellbore fluid onto the LCM objects to stop or reduce flow of the wellbore fluid through permeable portions into the subterranean formation.

10. The method of claim 9, wherein the first orientation comprises a lengthwise vertical orientation with respect to the top and the bottom, wherein the second orientation comprises a lengthwise horizontal orientation with respect to the top and the bottom wherein the permeable portions each comprises a width less than 1 millimeter (mm) and a depth into the rectangular cuboid body less than 4 mm, wherein the permeable portions each comprise multiple pores comprising a pore size less than 100 microns, wherein the pores are smaller than at least some of the solids, and wherein positioning the LCM objects comprise placing the LCM objects from Earth's surface into the wellbore and flowing the LCM objects in the wellbore to the loss circulation zone.

11. The method of claim 9, wherein the LCM objects comprise polymer or metal, wherein the rectangular cuboid body comprises a length less than 30 mm, a height less than 10 mm, and a width less than 10 mm, wherein the first orientation along a length of the permeable portions is perpendicular to the top and the bottom, and wherein the second orientation along the length of the permeable sections is parallel to the top and the bottom.

12. The method of claim 9, comprising fabricating the LCM objects by additive manufacturing comprising three dimensional (3D) printing, wherein the LCM objects comprise a first set of the LCM objects and a second set of the LCM objects, wherein the first orientation and the second orientation each are a lengthwise orientation, and wherein the first orientation and the second orientation are different by 90°.

13. The method of claim 9, comprising producing hydrocarbon from the subterranean formation, wherein producing the hydrocarbon comprises flowing the hydrocarbon from the subterranean formation through the permeable portions into the wellbore, wherein flowing the hydrocarbon through the permeable portions dislodges the solids collected onto the permeable portions of the LCM objects, wherein the first orientation is a lengthwise orientation that is vertical with respect to the top and the bottom, and wherein the second orientation is a lengthwise orientation that is horizontal with respect to the top and the bottom.

14. A method of applying loss circulation material (LCM) to a wellbore in a subterranean formation, the method comprising:
    pumping a slurry comprising base fluid, LCM objects, and solids into the wellbore to a loss circulation zone in the wellbore, the LCM objects each comprising a solid body comprising porous sections, each porous section having a length greater than its width, each porous section comprising pores, wherein the solid body comprises a rectangular cuboid shape having the porous sections embedded therein, wherein the porous sections are exposed external of the solid body, wherein a first set of the LCM objects comprise a first orientation of the porous sections along four sides of the rectangular cuboid body with respect to a top and a bottom of the rectangular cuboid body, wherein a second set of the LCM objects comprise a second orientation of the porous sections along the four sides with respect to the top and the bottom, and wherein the second orientation is different than the first orientation;
    allowing the LCM objects to arrange in the wellbore at the subterranean formation at the loss circulation zone;
    flowing the base fluid from the wellbore through the porous section of at least some of the LCM objects into the subterranean zone; and
    collecting the solids on the LCM objects to form a flow barrier to reduce or prevent loss circulation at the loss circulation zone.

15. The method of claim 14, wherein the first orientation is a lengthwise orientation that is vertical with respect to the top and the bottom, wherein the second orientation is a lengthwise orientation that is horizontal with respect to the top and the bottom, wherein the solid body comprises a length less than 30 millimeters (mm), a height less than 10 mm, and a width less than 10 mm.

16. The method of claim 14, wherein the first orientation and the second orientation each are a lengthwise orientation, wherein the first orientation is perpendicular to the second orientation, wherein the porous sections each comprise a width less than 1 mm and a depth into the solid body less than 4 mm, wherein the porous sections each comprises the pores comprising a pore size less than 100 microns, and wherein the porous sections on a given side of the four sides are spaced apart.

17. The method of claim 14, wherein the first orientation and the second orientation each are a lengthwise orientation, and wherein the first orientation and the second orientation are different by 90°, wherein the solid body comprises grooves, wherein the porous sections of each LCM object of the LCM objects comprises multiple porous sections, wherein each porous section is disposed in a respective groove of the grooves of the solid body, and wherein the solid body comprises polymer or metal.

18. The method of claim 14, comprising specifying that the LCM objects comprise the first set and the second set to advance fluid flow through the LCM objects as arranged at the loss circulation zone to collect the solids on the LCM objects to form the flow barrier, wherein the first orientation and the second orientation each are a lengthwise orientation, wherein the porous sections of each LCM object of the LCM objects comprise multiple porous sections spaced apart with respect to each other, and wherein the multiple porous sections each comprise multiple pores.

19. The method of claim 14, wherein the first orientation along the length of the porous sections is parallel to the top and the bottom, and wherein the second orientation along the length of the porous sections is perpendicular to the top and the bottom.

20. The method of claim 14, comprising producing hydrocarbon from the subterranean formation, wherein producing the hydrocarbon comprises flowing the hydrocarbon from the subterranean formation through the porous sections into the wellbore, wherein flowing the hydrocarbon through the porous sections displaces at least some of the solids collected on the LCM objects, wherein the first orientation along the length of the porous sections is vertical with respect to the top and the bottom, and wherein the second orientation along the length of the porous sections is horizontal with respect to the top and the bottom.

\* \* \* \* \*